(12) United States Patent
Kasubata et al.

(10) Patent No.: US 9,321,110 B2
(45) Date of Patent: Apr. 26, 2016

(54) HOLE DRILLING PROCESS, AND DRILLING TOOL

(75) Inventors: Yoshitake Kasubata, Tokyo (JP); Shigeru Okamoto, Tokyo (JP); Yuichi Sasaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 426 days.

(21) Appl. No.: 13/990,639

(22) PCT Filed: Feb. 9, 2012

(86) PCT No.: PCT/JP2012/052987
§ 371 (c)(1),
(2), (4) Date: May 30, 2013

(87) PCT Pub. No.: WO2012/111526
PCT Pub. Date: Aug. 23, 2012

(65) Prior Publication Data
US 2013/0259588 A1    Oct. 3, 2013

(30) Foreign Application Priority Data

Feb. 16, 2011 (JP) ................................. 2011 031383

(51) Int. Cl.
*B23B 35/00* (2006.01)
*B23B 39/04* (2006.01)
(Continued)

(52) U.S. Cl.
CPC .................. *B23B 39/04* (2013.01); *B23B 35/00* (2013.01); *B23B 39/08* (2013.01); *B23B 41/02* (2013.01);
(Continued)

(58) Field of Classification Search
CPC ........ B23B 39/04; B23B 39/08; B23B 35/00; B23B 2270/48; B23Q 15/22; B23Q 15/24; B23Q 17/2233; Y10T 408/03; Y10T 408/175
See application file for complete search history.

(56) References Cited

U.S. PATENT DOCUMENTS 3,475,997 A * 11/1969 Wohlfeil ................ G05B 19/23
                                                                  318/597
3,973,859 A *  8/1976 Huber ...................... B23B 39/14
                                                                  408/12
(Continued)

FOREIGN PATENT DOCUMENTS

JP          55-048556 A      4/1980
JP           59-1108 A       1/1984
(Continued)

OTHER PUBLICATIONS

English Translation of Written Opinion dated May 1, 2012, issued in corresponding application No. PCT/JP2012/052987.
(Continued)

*Primary Examiner* — Eric A Gates
(74) *Attorney, Agent, or Firm* — Westerman, Hattori, Daniels & Adrian, LLP

(57) ABSTRACT

The hole drilling process is for drilling a hole on a supported tube sheet by using a first drilling tool that can drill a hole with a diameter smaller than that of a mounting hole that is to become a target hole, and a second drilling tool that can drill a hole with a diameter equal to the diameter of the target hole, the process including: a temporary hole drilling step in which a temporary hole with a predetermined depth set beforehand is drilled by moving the first drilling tool to a drilled position set beforehand; a hole measuring step in which a distance (S) between an existing mounting hole and the temporary hole; a drilled position correcting step in which the drilled position is corrected based upon the distance (S) between the mounting hole and the temporary hole.

6 Claims, 18 Drawing Sheets

(51) Int. Cl.
*B23B 39/08* (2006.01)
*B23Q 17/22* (2006.01)
*B23Q 15/24* (2006.01)
*B23B 41/02* (2006.01)
*B23B 51/04* (2006.01)

(52) U.S. Cl.
CPC ............ *B23B 51/0486* (2013.01); *B23Q 15/24* (2013.01); *B23Q 17/2233* (2013.01); *B23B 2251/201* (2013.01); *B23B 2251/202* (2013.01); *B23B 2251/422* (2013.01); *B23B 2251/56* (2013.01); *B23B 2270/48* (2013.01); *Y10T 408/03* (2015.01); *Y10T 408/175* (2015.01); *Y10T 408/5665* (2015.01)

(56) References Cited

U.S. PATENT DOCUMENTS

| | | | | |
|---|---|---|---|---|
| 5,758,558 | A | * | 6/1998 | Squires .................. B23D 15/06 33/626 |
| 5,920,973 | A | * | 7/1999 | Kosmowski ............ B23B 39/16 29/26 A |
| 7,909,549 | B2 | * | 3/2011 | Kondoh .................. B23B 35/00 408/1 R |
| 2008/0175681 | A1 | * | 7/2008 | Tataei .................... B23B 41/00 408/16 |
| 2015/0367474 | A1 | * | 12/2015 | Uekita ............... B23Q 17/2275 408/13 |

FOREIGN PATENT DOCUMENTS

| | | |
|---|---|---|
| JP | 61-10265 B2 | 3/1986 |
| JP | 62-184955 U | 11/1987 |
| JP | 2004-327922 A | 11/2004 |

OTHER PUBLICATIONS

Japanese Decision of a Patent Grant dated Dec. 2, 2014, issued in corresponding Japanese Application No. 2011-031383; w/English Translation. (3 pages).

International Search Report for PCT/JP2012/052987, Maling Date of May 1, 2012.

Witten Opinion for PCT/JP2012/052987, Mailing Date of May 1, 2012.

\* cited by examiner

HOLE DRILLING PROCESS, AND DRILLING TOOL

FIELD

The present invention relates to a hole drilling process for forming a hole on a tube support plate or a tube sheet in order to support a heat-transfer tube in a steam generator used as a heat exchanger in an nuclear power plant, for example, and a drilling tool used in the hole drilling process.

BACKGROUND

In a PWR (pressurized water reactor), light water is used as a nuclear reactor coolant and a neutron moderator, and used as high-temperature high-pressure water that is not boiled over a reactor internal. This high-temperature high-pressure water is transmitted to a steam generator to generate steam by heat exchange, and this steam is transmitted to a turbine generator to generate power. The pressurized water reactor transfers heat of high-temperature high-pressure primary cooling water to secondary cooling water by the steam generator, and generates water vapor by the secondary cooling water. In the steam generator, the primary cooling water flows into a large number of small heat-transfer tubes, and heat is transferred to the secondary cooling water flowing on the outside of the heat-transfer tubes, whereby water vapor is generated. The turbine is driven by the water vapor to generate power.

In the steam generator, a tube bundle shroud is arranged in a sealed hollow body so as to have a predetermined space between an inner wall surface of the body and the tube bundle shroud. Plural heat-transfer tubes, each having a reversed U-shape, are arranged in the tube bundle shroud. An end of each heat-transfer tube is supported by a tube sheet, and on a lower end of the body, an inlet channel head and an outlet channel head of the primary cooling water are formed. An inlet part of the secondary cooling water is formed above the tube bundle shroud in the body, and a steam-water separator and a moisture separator are arranged side by side in the vertical direction. A steam outlet is formed above these separators.

Therefore, the primary cooling water is fed to the plural heat-transfer tubes from a cooling water pipe via the inlet channel head, while the secondary cooling water is fed into the body from the inlet part. Heat exchange is done between the primary cooling water (hot water) flowing through the plural heat-transfer tubes and the secondary cooling water (cool water) circulating in the body. Accordingly the secondary cooling water absorbs heat to generate water vapor. Water is removed from the generated steam by the steam-water separator, and moisture is removed by the moister separator. The resultant steam is discharged from a steam outlet, while the primary cooling water that finishes the heat exchange is discharged from the outlet channel head.

In the steam generator thus configured, a large number of heat-transfer tubes provided in the body are supported by plural tube support plates and the tube sheet. The heat-transfer tubes and the tube sheet are inserted into a large number of holes formed on the tube support plates and the tube sheet, whereby the large number of heat-transfer tubes are supported by the tube support plates and the tube sheet without being vibrated. In this case, the tube support plates and the tube sheet have a large number of holes, so that these holes have to be formed by efficient drilling process.

CITATION LIST

Patent Literature

Patent Literature 1: Japanese Examined Patent Publication No. 61-010265

SUMMARY

Technical Problem

As described above, the tube support plate and the tube sheet have to be formed with a large number of holes. Therefore, all holes are formed by a stepwise hole drilling process by using a drilling tool with the tube support plate and the tube sheet being supported by a support device. In this case, holes are formed one by one on the tube support plate and the tube sheet by the hole drilling process, so that the weight of a part of the tube support plate and the tube sheet reduces. Therefore, the weight balance is destroyed. Since the hole drilling process is continuously executed, the tube support plate and the tube sheet have high temperature, and thermally expand. Therefore, the drilled position (secondary coordinate position) by the drilling tool on the tube support plate (tube sheet) set beforehand and the actual drilled position on the tube support plate that has the destroyed balance or that thermally expands might be shifted from each other. As a result, it is difficult to perform high precise hole drilling process. In the above-mentioned Patent Literature 1, a position of an existing hole is measured to correct a drilled position. This requires complicated control.

The present invention is accomplished for solving the above-mentioned problem, and aims to provide a hole drilling process and a drilling tool that can realize a high-precise hole drilling with a simple technique.

Solution to Problem

According to an aspect of the present invention, a hole drilling process for drilling a hole on a supported member to be processed by using a first drilling tool that can drill a hole with a diameter smaller than that of a target hole, and a second drilling tool that can drill a hole with a diameter equal to the diameter of the target hole, the process includes: a temporary hole drilling step in which a temporary hole with a predetermined depth set beforehand is drilled by moving the first drilling tool to a drilled position set beforehand; a hole measuring step in which a distance between an existing target hole and the temporary hole; a drilled position correcting step in which the drilled position is corrected based upon the distance between the existing target hole and the temporary hole; and a target hole drilling step in which the target hole is drilled by moving the second drilling tool to the corrected drilled position.

Therefore, the temporary hole is drilled on the drilled position set beforehand, the distance between the existing target hole and the temporary hole is measured, the drilled position is corrected based upon the measured distance, and the target hole is drilled on the corrected drilled position. Accordingly, even if the weight balance of the member to be processed is destroyed, or the member to be processed thermally expands, the drilled position is corrected according to the destroyed balance or the thermal expansion. Consequently, a high-precise hole drilling can be realized with a simple technique.

Advantageously, the hole drilling process includes: a position determining step in which whether the correction of the drilled position is needed or not is determined based upon the distance between the existing target hole and the temporary hole; and a second temporary hole drilling step in which, when the correction of the drilled position is determined to be needed, the first drilling tool is moved to the corrected drilled position for drilling a temporary hole with a depth deeper than the depth of the previously-formed temporary hole.

When it is determined that the correction of the drilled position is needed based upon the distance between the existing target hole and the temporary hole, the first drilling tool is moved to the corrected drilled position so as to form a temporary hole having a depth deeper than that of the previously-formed temporary hole. Therefore, whether the correction of the drilled position is needed or not can repeatedly be determined based upon the distance between the target hole and the temporary hole, whereby the precision of drilling the target hole can be enhanced.

Advantageously, in the hole drilling process, the second drilling tool is moved to the drilled position where the temporary hole is drilled in the previous process for drilling the target hole in the target hole drilling step, when it is determined that the correction of the drilled position is not needed.

When it is determined that the correction of the drilled position is unnecessary, the target hole is drilled on the same position by using the second drilling tool. Therefore, the precision of drilling the target hole can be enhanced.

Advantageously, in the hole drilling process, the first drilling tool or the second drilling tool can be mounted on a tip end of a processing shaft that is rotatable and that can move in the shaft direction and in two directions crossing the shaft direction, the first drilling tool is mounted on the tip end of the processing shaft in the temporary hole drilling step, and the second drilling tool is mounted on the tip end of the processing shaft in the target hole drilling step.

Therefore, the first drilling tool and the second drilling tool can be exchanged, so that the temporary hole and the target hole can easily be drilled. Accordingly, the precision of drilling the target hole can be enhanced with a simple operation.

Advantageously, in the hole drilling process, the member to be processed includes a hole drilled region that is divided into plural regions, and the hole drilling process is carried out based upon the temporary hole drilling step, the hole measuring step, the drilled position correcting step, and the target hole drilling step, when the drilled region is changed.

Accordingly, when the drilled region is changed, whether the correction of the drilled position is needed or not is determined based upon the measured distance between the existing target hole and the temporary hole, whereby the precision of drilling the target hole can be enhanced.

In the hole drilling process according to the present invention, the hole drilling process is carried out based upon the temporary hole drilling step, the hole measuring step, the drilled position correcting step, and the target hole drilling step, when a hole is drilled on a drilled position around which an existing target hole is formed.

Accordingly, when the hole is drilled on the drilled position around which the existing target hole is formed, whether the correction of the drilled position is needed or not is determined based upon the measured distance between the existing target hole and the temporary hole, whereby the precision of drilling the target hole can be enhanced.

A drilling tool according to the present invention is used for drilling a temporary hole to a supported member to be processed in a hole drilling process in which the temporary hole with a diameter smaller than a diameter of a target hole is drilled, and after the drilled position of the temporary hole is measured and determined, a target hole is drilled with respect to the temporary hole, the tool including: a cylindrical tool body; a cutting blade that is mounted on a tip end of the tool body so as to be capable of drilling the temporary hole; and a guide member that is mounted on the tip end of the tool body to be closer to a base end than to the cutting blade, and that has an outer diameter equal to an inner diameter of the target hole.

When the temporary hole is drilled by moving forward the drilling tool, the cutting blade of the tool body drills the temporary hole on the member to be processed, and the guide member guides the tool body. Therefore, the vibration of the tool body can be prevented, whereby the precision of drilling the temporary hole and the target hole can be enhanced.

Advantageous Effects of Invention

According to the hole drilling process and the drilling tool according to the present invention, the first drilling tool that can drill a hole with a diameter smaller than a diameter of a target hole and a second drilling tool that can drill a hole with a diameter equal to the diameter of the target hole are used, the temporary hole is drilled on the drilled position set beforehand, the distance between the existing target hole and the temporary hole is measured, the drilled position is corrected based upon the measured distance, and the target hole is drilled on the corrected drilled position. Accordingly, even if the weight balance of the member to be processed is destroyed, or the member to be processed thermally expands, the drilled position is corrected according to the destroyed balance or the thermal expansion. Consequently, a high-precise hole drilling can be realized with a simple technique. In this case, the temporary hole can be drilled with high precision by a simple structure by using a drilling tool (first drilling tool) having a cutting blade that can drill the temporary hole and a guide member that has an outer diameter equal to the inner diameter of the target hole.

BRIEF DESCRIPTION OF DRAWINGS

FIG. 9-1 is a schematic view illustrating a procedure of the hole drilling process according to the embodiment of the present invention.

FIG. 9-2 is a schematic view illustrating a procedure of the hole drilling process according to the embodiment of the present invention.

FIG. 9-3 is a schematic view illustrating a procedure of the hole drilling process according to the embodiment of the present invention.

FIG. 9-4 is a schematic view illustrating a procedure of the hole drilling process according to the embodiment of the present invention.

FIG. 10-1 is a schematic view illustrating a procedure of another hole drilling process according to the embodiment of the present invention.

FIG. 10-2 is a schematic view illustrating a procedure of another hole drilling process according to the embodiment of the present invention.

FIG. 10-3 is a schematic view illustrating a procedure of another hole drilling process according to the embodiment of the present invention.

FIG. 10-4 is a schematic view illustrating a procedure of another hole drilling process according to the embodiment of the present invention.

FIG. 13-1 is a schematic view illustrating a procedure of the hole drilling process using a temporary hole according to the embodiment of the present invention.

FIG. 13-2 is a schematic view illustrating a procedure of the hole drilling process using a temporary hole according to the embodiment of the present invention.

FIG. 13-3 is a schematic view illustrating a procedure of the hole drilling process using a temporary hole according to the embodiment of the present invention.

FIG. 13-4 is a schematic view illustrating a procedure of the hole drilling process using a temporary hole according to the embodiment of the present invention.

FIG. 13-5 is a schematic view illustrating a procedure of the hole drilling process using a temporary hole according to the embodiment of the present invention.

FIG. 13-6 is a schematic view illustrating a procedure of the hole drilling process using a temporary hole according to the embodiment of the present invention.

DESCRIPTION OF EMBODIMENTS

A preferable embodiment of a hole drilling process and a drilling tool according to the present invention will be described in detail with reference to the appended drawings. The present invention is not limited by the embodiment, and when there are plural embodiments, a structure formed by combining the respective embodiments is included in the present invention.

Embodiment

Figure 1:
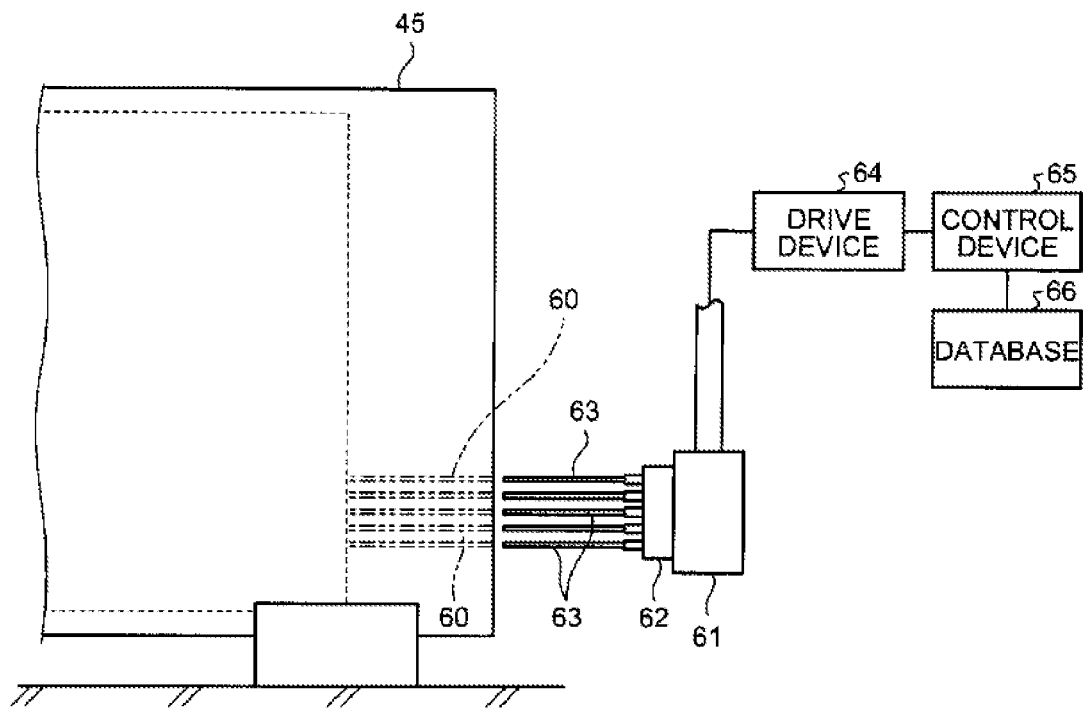
FIG. 1 is a front view illustrating a hole drilling device according to one embodiment of the present invention.
Figure 2:
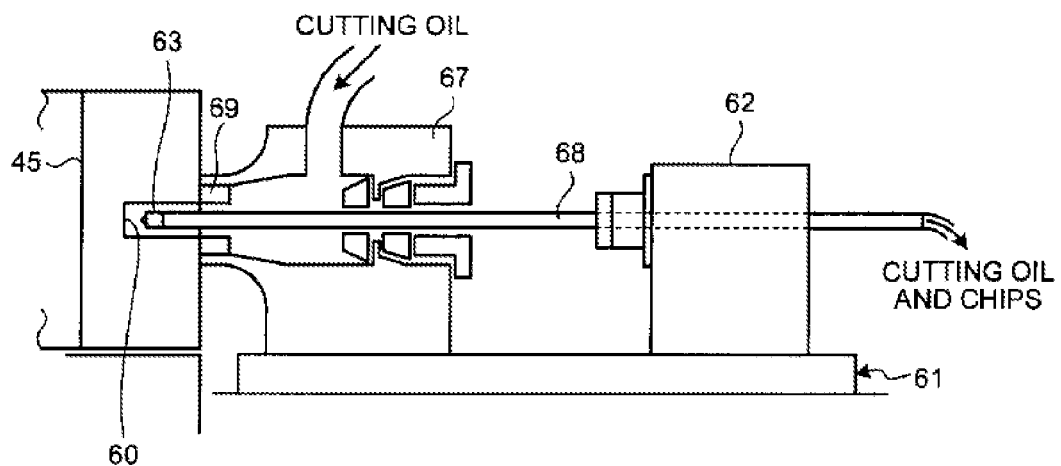
FIG. 2 is a schematic view illustrating a BTA processing device in the hole drilling device according to the embodiment of the present invention.
Figure 3:
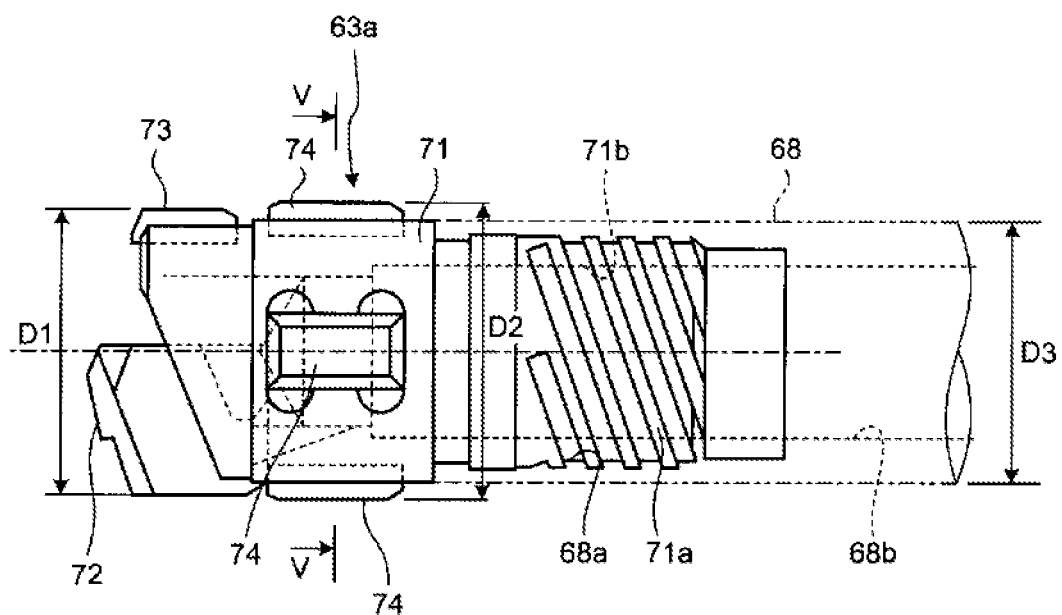
FIG. 3 is a side view illustrating a first drilling tool.
Figure 4:
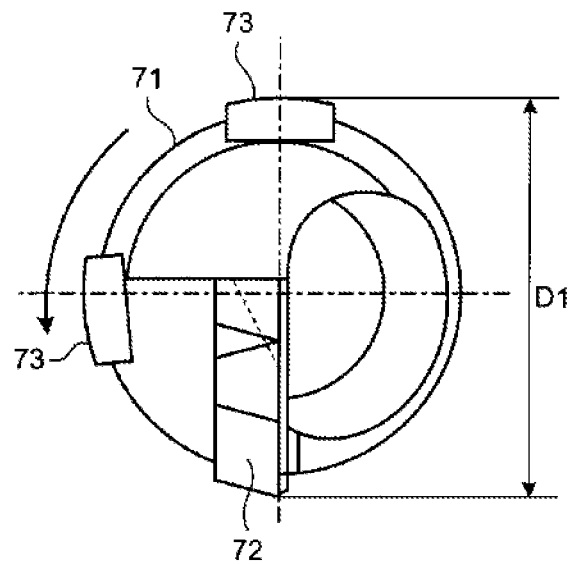
FIG. 4 is a front view of the first drilling tool.
Figure 5:
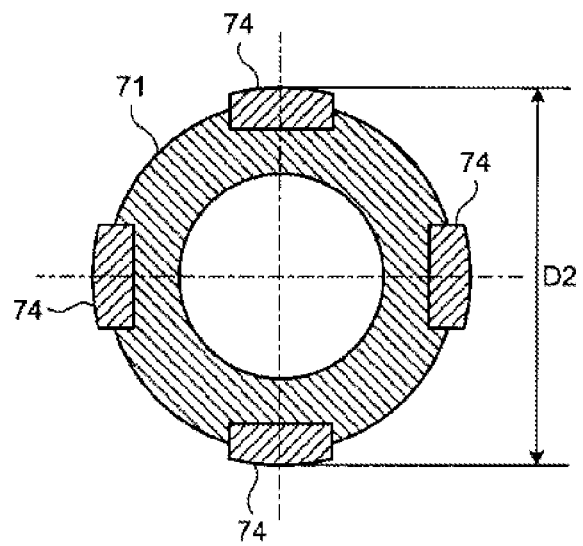
FIG. 5 is a sectional view (along a line V-V in FIG. 3) of the first drilling tool.
Figure 6:
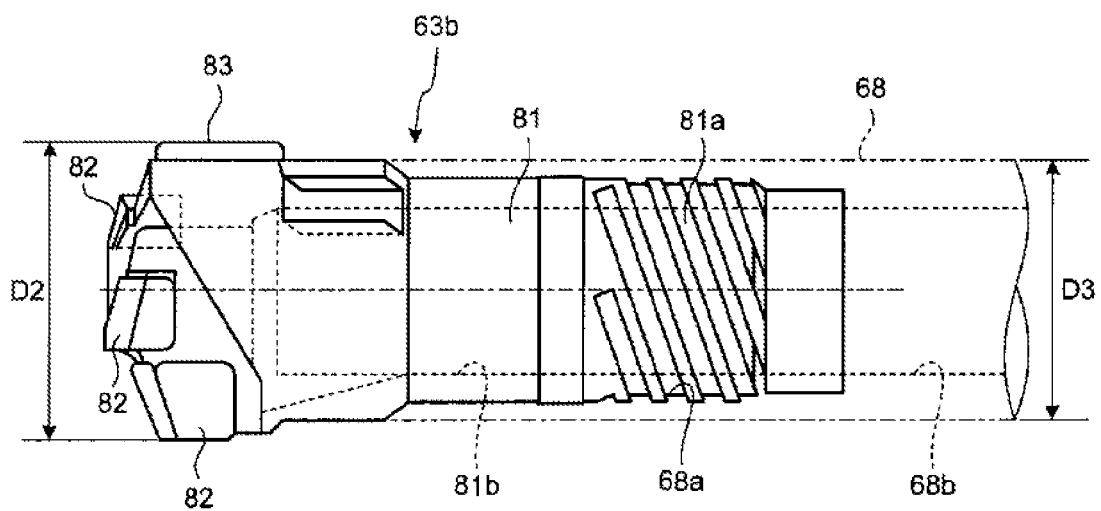
FIG. 6 is a side view illustrating a second drilling tool.
Figure 7:
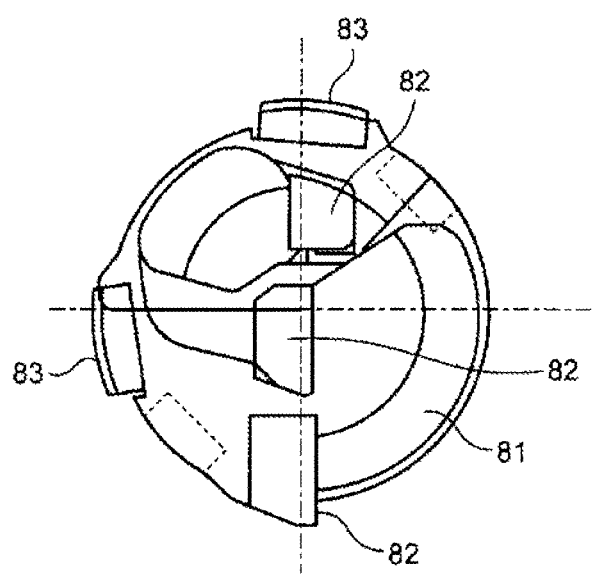
FIG. 7 is a front view of the second drilling tool.
Figure 8:
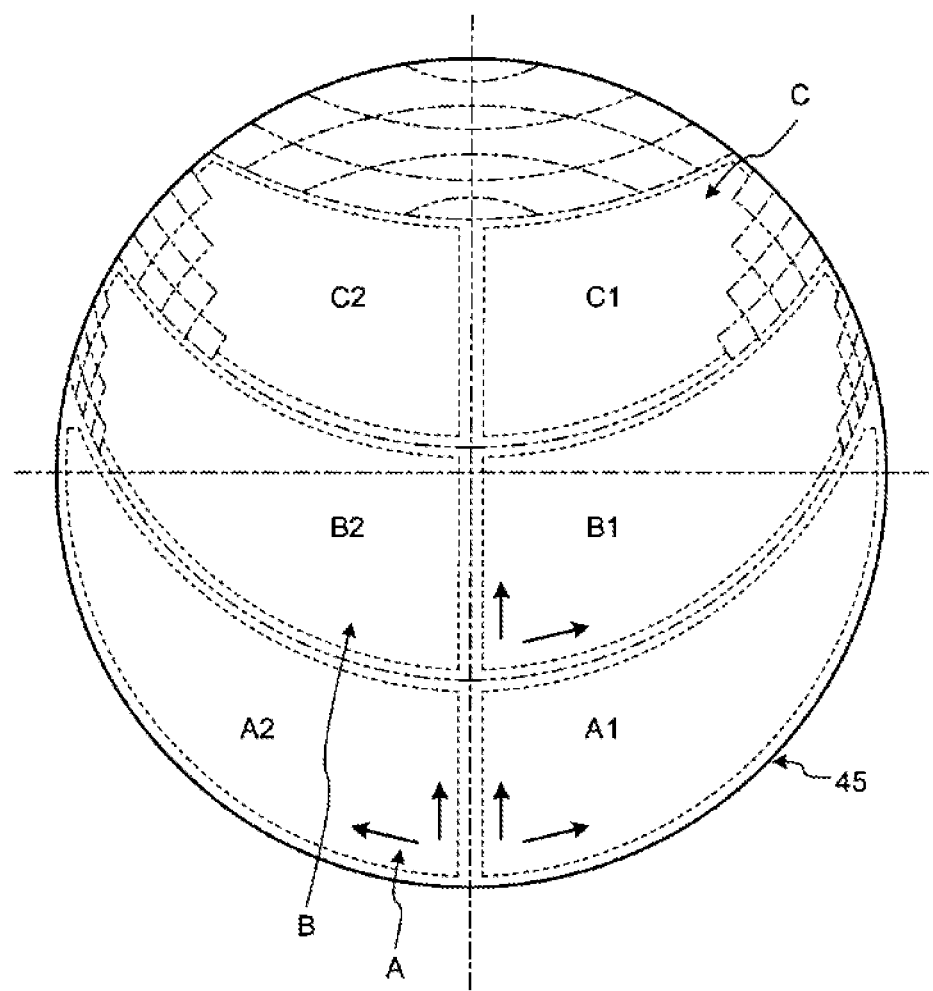
FIG. 8 is a schematic view illustrating divided regions in a hole drilling process according to the embodiment of the present invention.
Figures 1, 9:
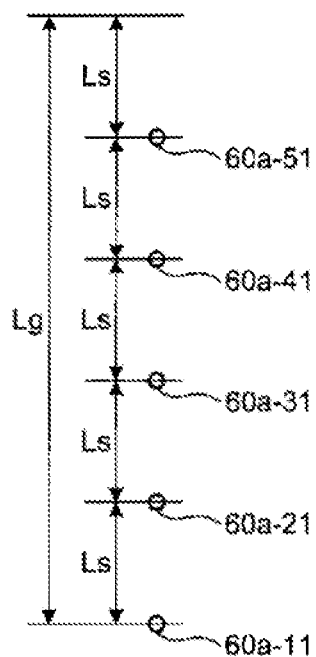
Figures 2, 9:
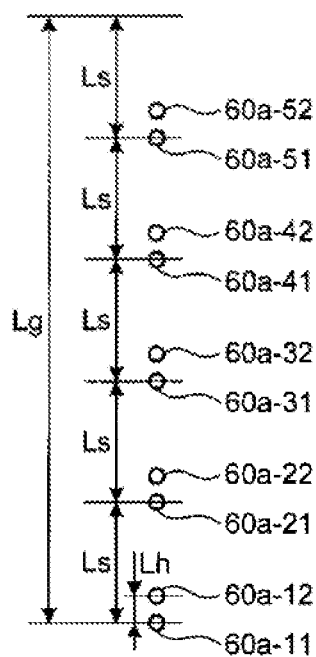
Figures 3, 9:
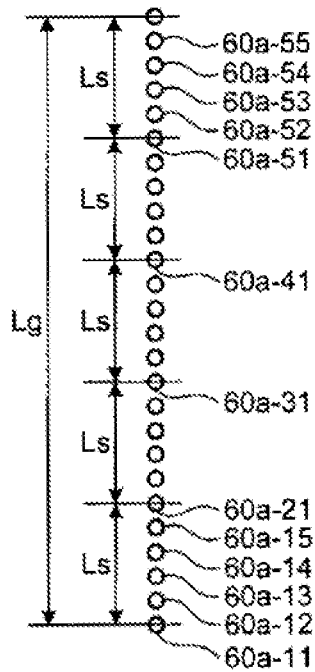
Figures 4, 9:
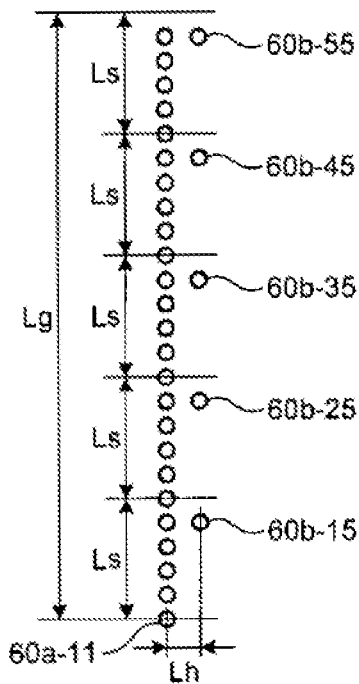
Figures 1, 10:
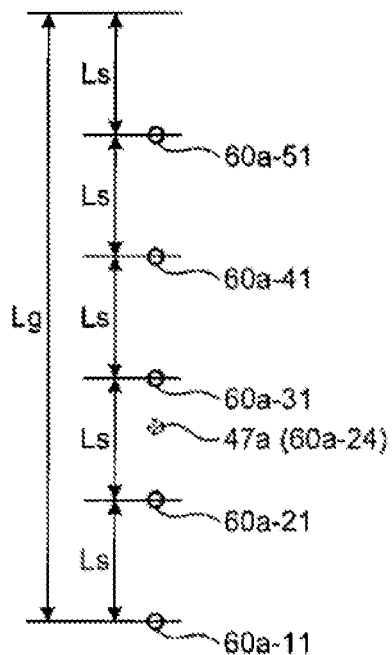
Figures 2, 10:
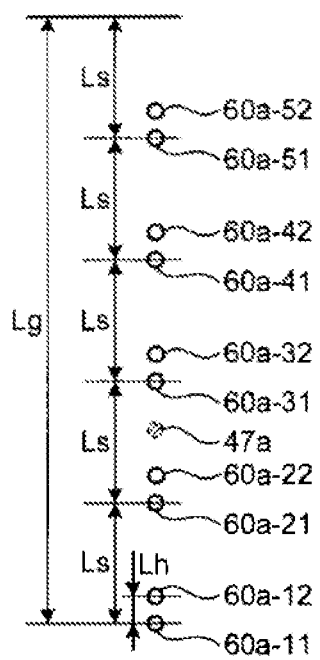
Figures 3, 10:
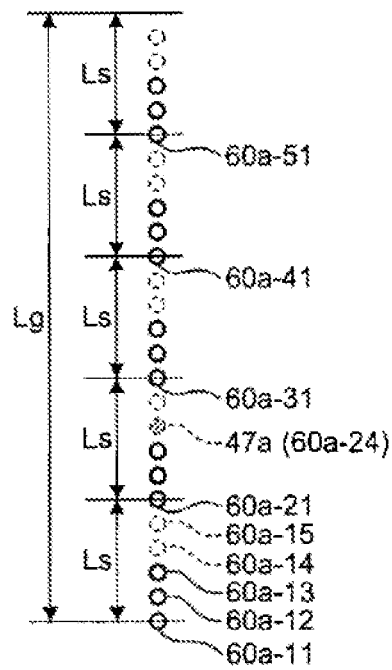
Figures 4, 10:
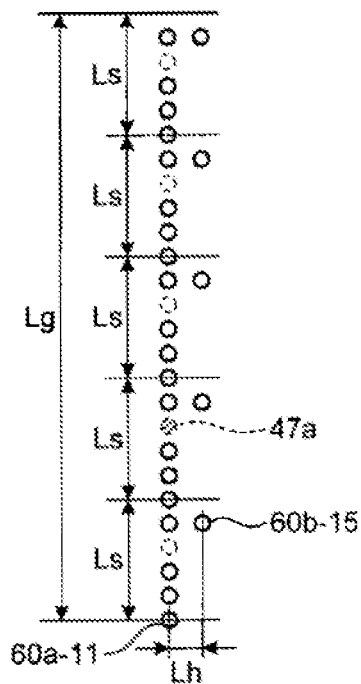
Figure 11:
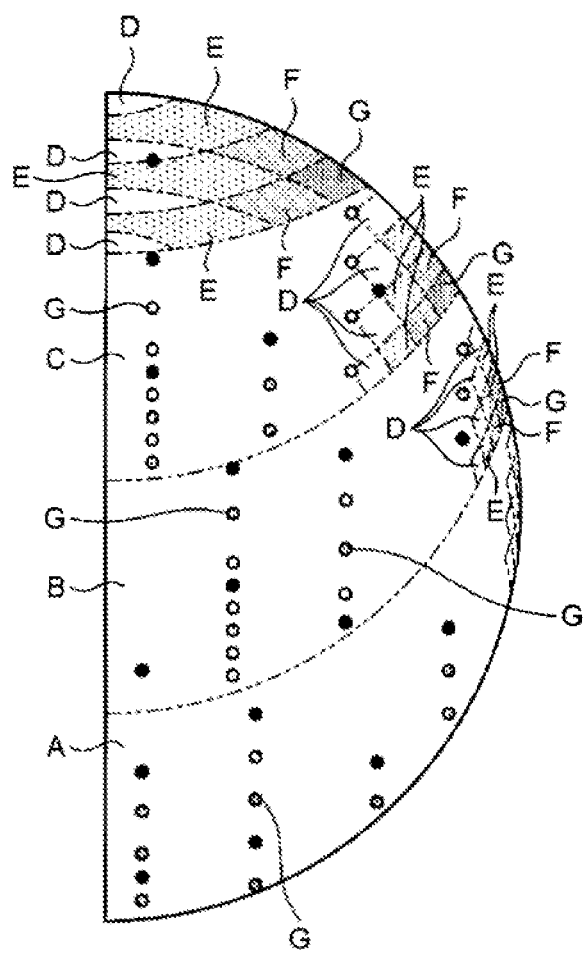
FIG. 11 is a schematic view illustrating a state of a tube sheet formed according to the hole drilling process of the embodiment of the present invention.
Figure 12:
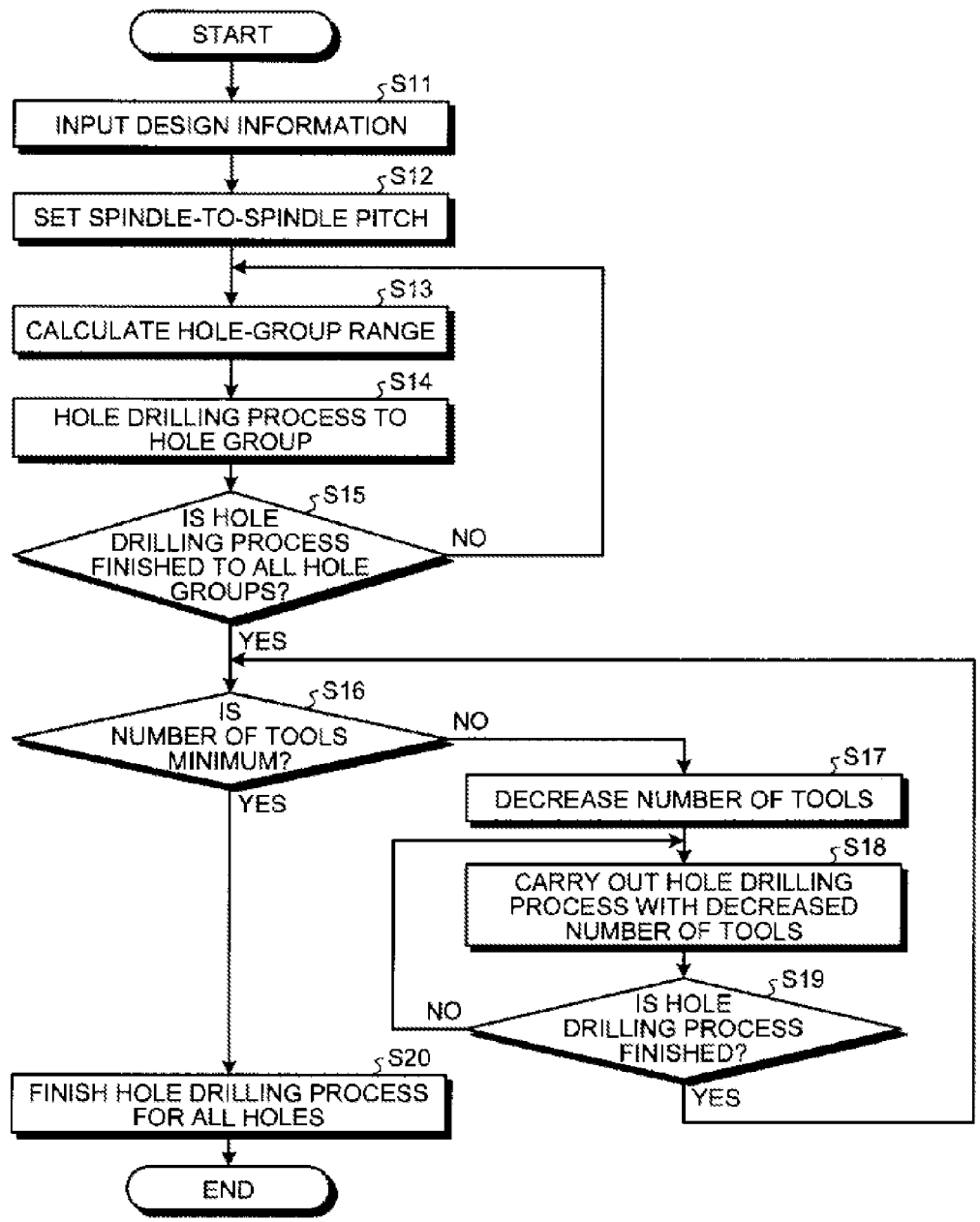
FIG. 12 is a flowchart illustrating the hole drilling process according to the embodiment of the present invention.
Figures 1, 13:
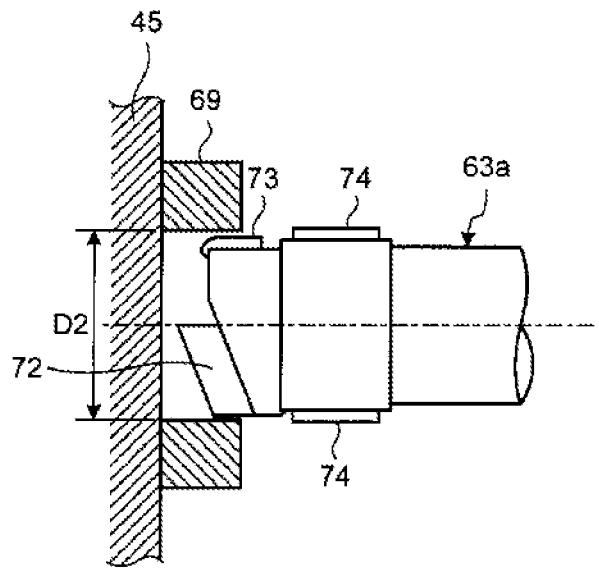
Figures 2, 13:
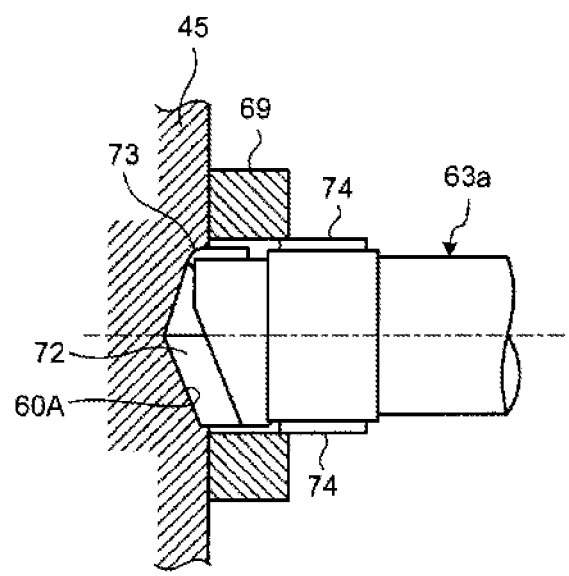
Figures 3, 13:
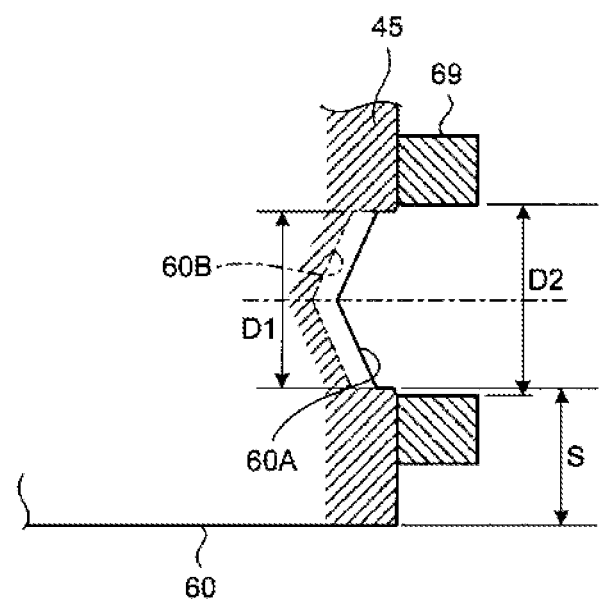
Figures 4, 13:
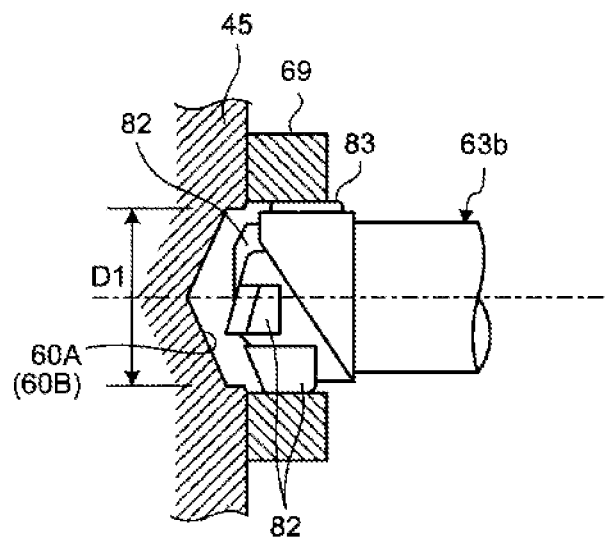
Figures 5, 13:
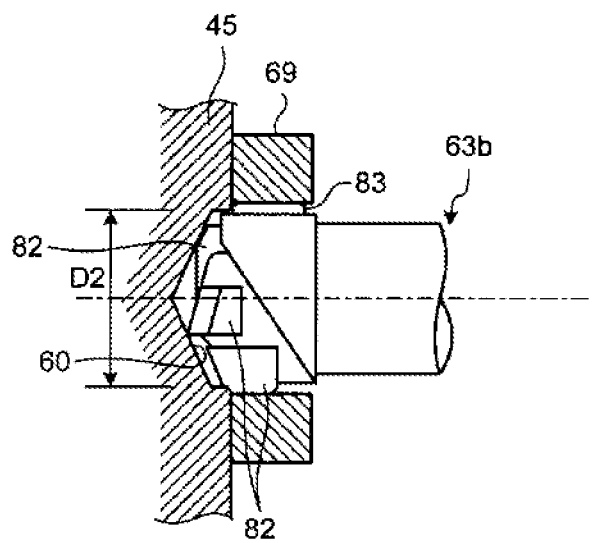
Figures 6, 13:
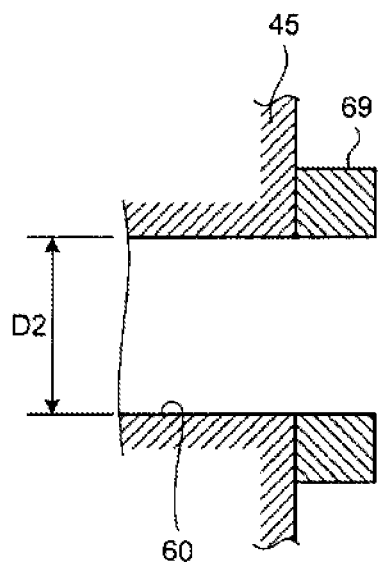
Figure 14:
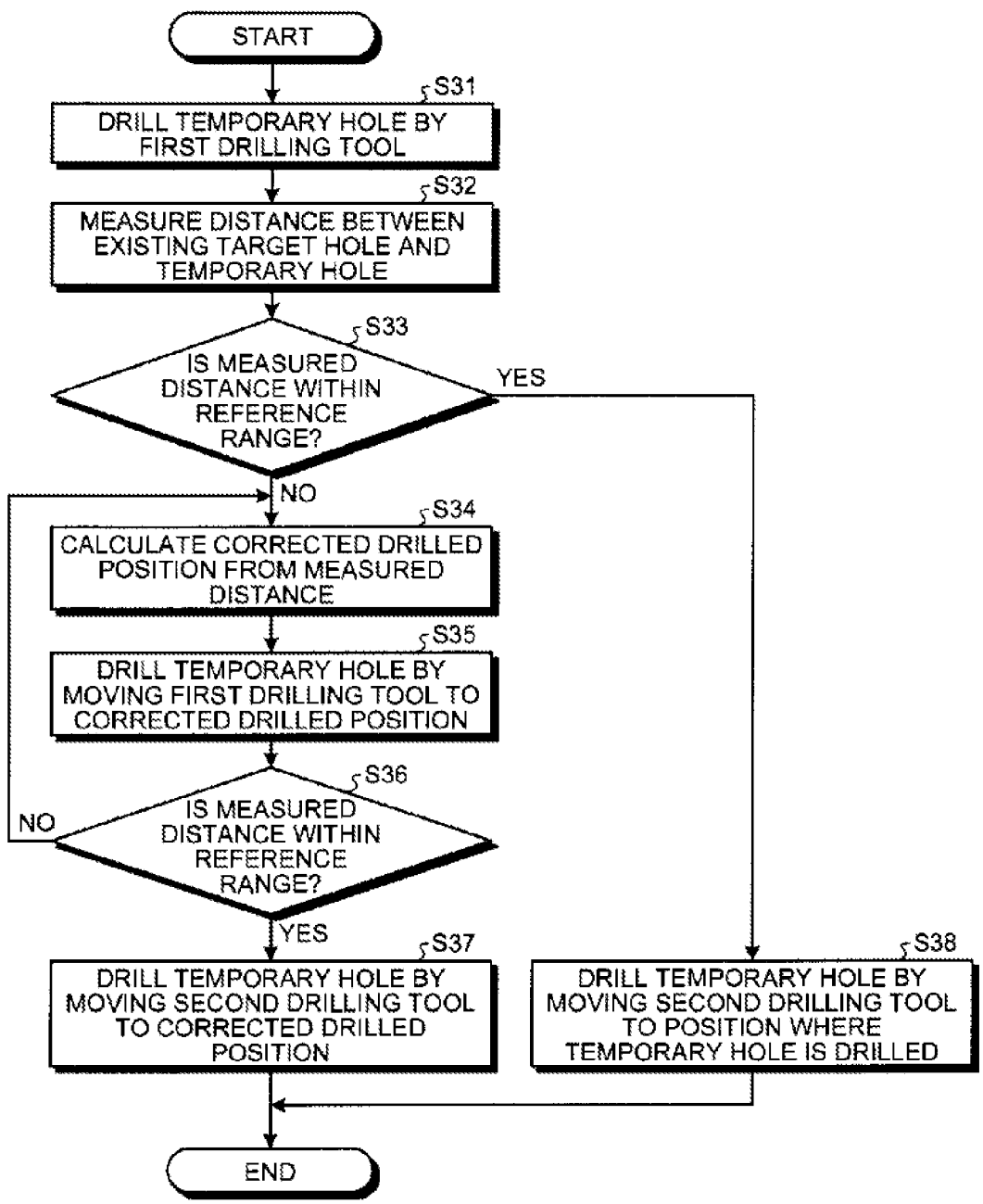
FIG. 14 is a flowchart illustrating the hole drilling process using the temporary hole according to the embodiment of the present invention.
Figure 15:
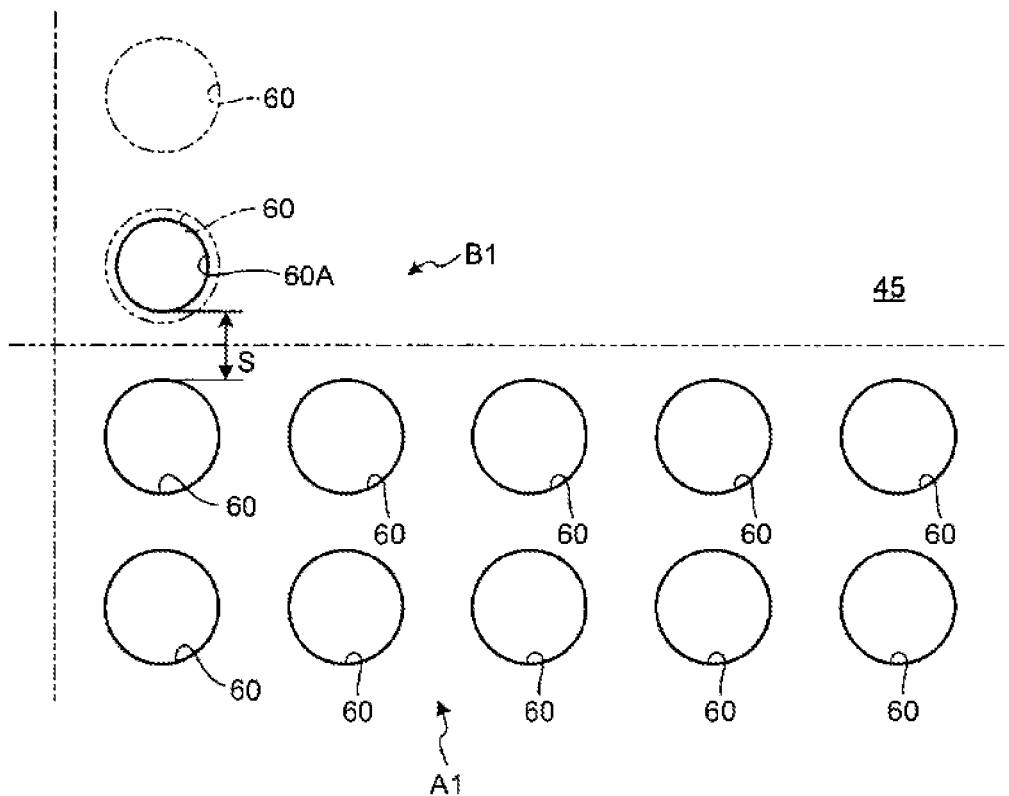
FIG. 15 is a schematic view illustrating a state of a tube sheet formed according to the hole drilling process using the temporary hole according to the embodiment of the present invention.
Figure 16:
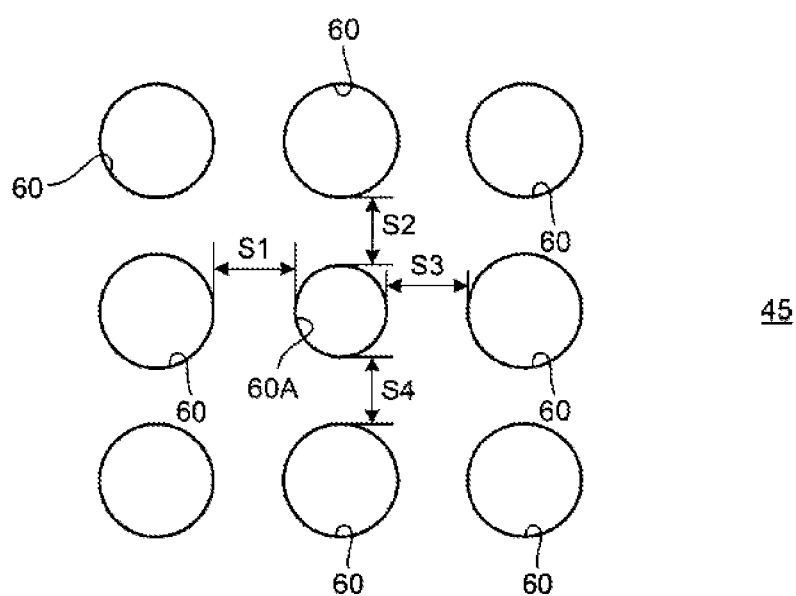
FIG. 16 is a schematic view illustrating a state of a tube sheet formed according to the hole drilling process using the temporary hole according to the embodiment of the present invention.
Figure 17:
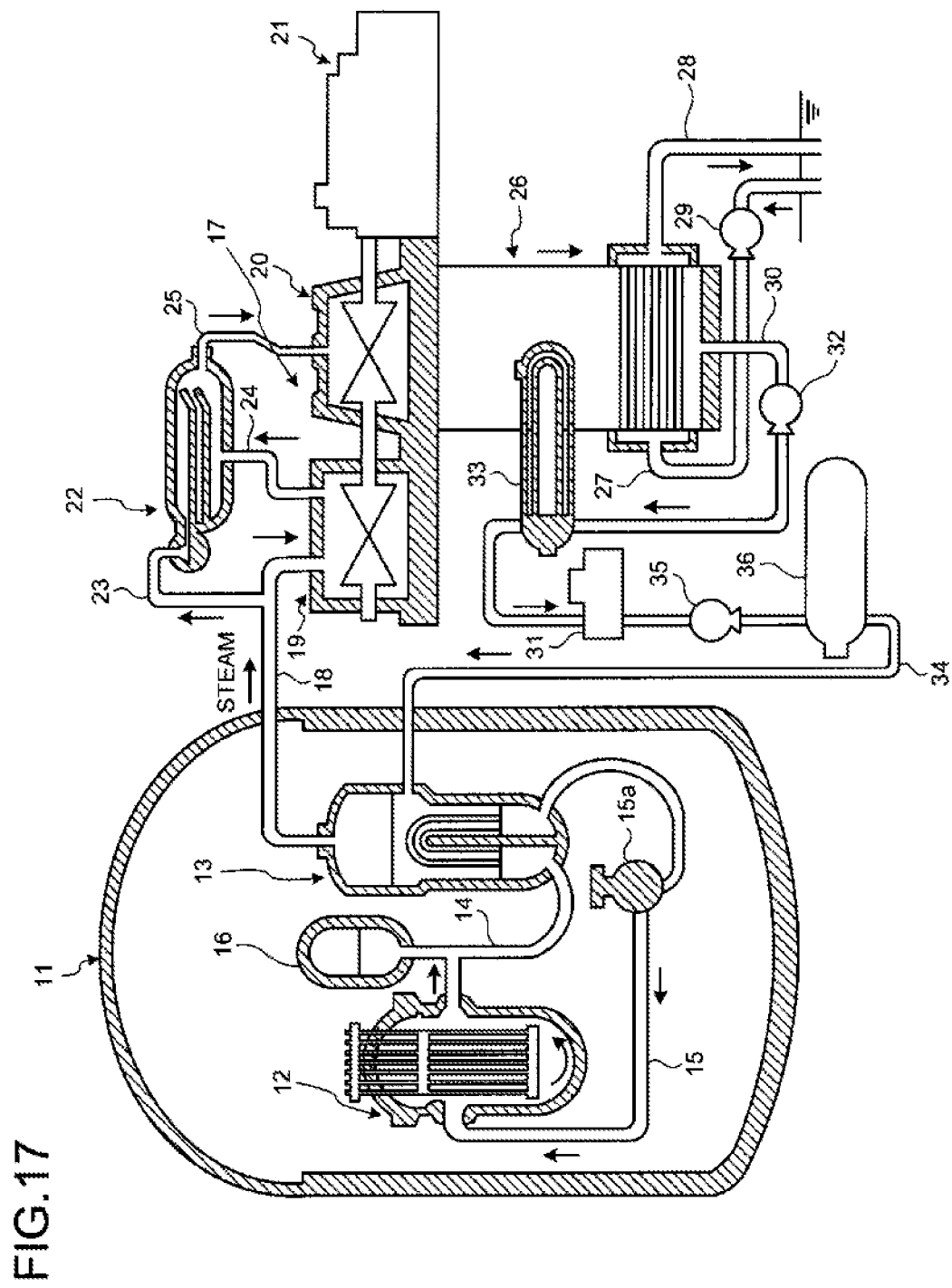
FIG. 17 is a schematic view illustrating a configuration of an nuclear power plant to which a steam generator according to the embodiment of the present invention is applied.
Figure 18:
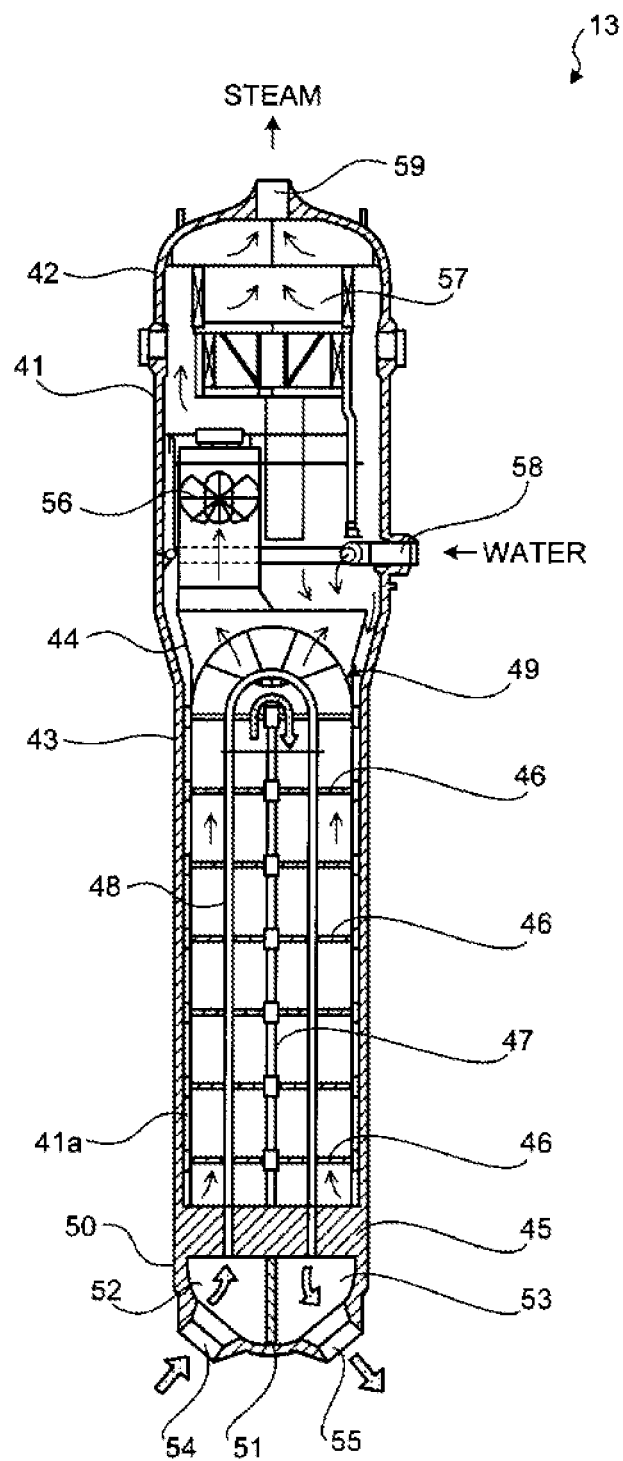
FIG. 18 is a schematic view illustrating a configuration of the steam generator according to the embodiment of the present invention.

FIG. 1 is a front view illustrating a hole drilling device according to one embodiment of the present invention, FIG. 2 is a schematic view illustrating a BTA processing device in the hole drilling device according to the present embodiment, FIG. 3 is a side view illustrating a first drilling tool, FIG. 4 is a front view of the first drilling tool, FIG. 5 is a sectional view (along a line V-V in FIG. 3) of the first drilling tool, FIG. 6 is a side view of a second drilling tool, FIG. 7 is a front view of the second drilling tool, FIG. 8 is a schematic view illustrating divided regions in a hole drilling process according to the present embodiment, FIGS. 9-1 to 9-4 are schematic views illustrating a procedure of the hole drilling process according to the present embodiment, FIGS. 10-1 to 10-4 are schematic views illustrating a procedure of another hole drilling process according to the present embodiment, FIG. 11 is a schematic view illustrating a state of a tube sheet formed according to the hole drilling process of the present embodiment, FIG. 12 is a flowchart illustrating the hole drilling process according to the present embodiment, FIGS. 13-1 to 13-6 are schematic views illustrating a procedure of the hole drilling process using a temporary hole according to the present embodiment, FIG. 14 is a flowchart illustrating the hole drilling process using the temporary hole according to the present embodiment, FIGS. 15 and 16 are schematic views illustrating a state of a tube sheet formed by the hole drilling process using the temporary hole according to the present embodiment, FIG. 17 is a schematic view illustrating a configuration of an nuclear power plant to which a steam generator according to the present embodiment is applied, and FIG. 18 is a schematic view illustrating a configuration of the steam generator according to the present embodiment.

The nuclear reactor in the present embodiment is a pressurized water reactor (PWR) that uses light water as a nuclear reactor coolant and a neutron moderator, and uses the light water as high-temperature high-pressure water that is not boiled over a reactor internal. In the pressurized water reactor, this high-temperature high-pressure water is transmitted to a steam generator to generate steam by heat exchange, and this steam is transmitted to a turbine generator to generate power.

In an nuclear power plant having the pressurized water reactor according to the present embodiment, a pressurized water reactor 12 and a steam generator 13 are stored in a containment 11 as illustrated in FIG. 17. The pressurized water reactor 12 and the steam generator 13 are coupled with cooling water pipes 14 and 15. A pressurizer 16 is provided on the cooling water pipe 14, and a cooling water pump 15a is provided on the cooling water pipe 15. In this case, the light water is used as the moderator and the primary cooling water (coolant), and the primary cooling system is controlled to keep a high-pressure condition with about 150 to 160 atmosphere by the pressurizer 16 in order to prevent the primary cooling water from boiling on a reactor internal. Therefore, in the pressurized water reactor 12, the light water serving as the primary cooling water is heated by low-enriched uranium or MOX serving as fuel (nuclear fuel), and the primary cooling water having high temperature is kept to have a predetermined high pressure by the pressurizer 16, and with this state, sent to the steam generator 13 through the cooling water pipe 14. In the steam generator 13, heat exchange is done between the primary cooling water having high temperature and high pressure and the secondary cooling water. The cooled primary cooling water is returned to the pressurized water reactor 12 through the cooling water pipe 15.

The steam generator 13 is coupled to a steam turbine 17 via a cooling water pipe 18. The steam turbine 17 has a high-pressure turbine 19 and a low-pressure turbine 20, and a generator 21 is connected to the steam turbine 17. A moisture separating heater 22 is provided between the high-pressure turbine 19 and the low-pressure turbine 20. A cooling water pipe 23 bifurcated from the cooling water pipe 18 is coupled to the moisture separating heater 22. The high-pressure turbine 19 and the moisture separating heater 22 are coupled to each other via a low-temperature reheat pipe 24, while the moisture separating heater 22 and the low-pressure turbine 20 are coupled to each other via a high-temperature reheat pipe 25.

The low-pressure turbine 20 in the steam turbine 17 includes a steam condenser 26, and an intake pipe 27 and an exhaust pipe 28 for feeding and exhausting cooling water (e.g., seawater) are coupled to the steam condenser 26. The intake pipe 27 includes a circulating water pump 29, and the other end is arranged in seawater together with the other end of the exhaust pipe 28. The steam condenser 26 is coupled to a deaerator 31 via a cooling water pipe 30, and the cooling water pipe 30 is provided with a condensate pump 32 and a low-pressure feed-water heater 33. The deaerator 31 is coupled to the steam generator 13 via a cooling water pipe 34. A feed-water pump 35 and a high-pressure feed-water heater 36 are provided on the cooling water pipe 34.

Therefore, steam generated through the heat exchange with the high-pressure high-temperature primary cooling water in the steam generator 13 is sent to the steam turbine 17 (from the high-pressure turbine 19 to the low-pressure turbine 20) via the cooling water pipe 18, and this steam drives the steam turbine 17, whereby the generator 21 generates power. In this case, the steam generated from the steam generator 13 drives the high-pressure turbine 19, and then, is heated with moisture contained in the steam being removed by the moisture separating heater 22. Thereafter, the resultant steam drives the low-pressure turbine 20. The steam driving the steam turbine 17 is cooled by use of seawater in the steam condenser 26 to become a steam condensate, and heated by the low-pressure feed-water heater 33 with low-pressure steam extracted from the low-pressure turbine 20. Then, impurities such as dissolved oxygen or non-condensable gas (ammonia gas) are removed by the deaerator 31. The resultant steam is then heated by the high-pressure feed-water heater 36 with high-pressure steam extracted from the high-pressure turbine 19, and then, returned to the steam generator 13.

In the steam generator 13 applied in the nuclear power plant thus configured, a body 41 has a sealed hollow cylindrical shape, and its lower part has a diameter slightly smaller than a diameter of its upper part as illustrated in FIG. 18. The body 41 is formed by bonding an upper body 42 and a lower body 43 by welding. A cylindrical tube bundle shroud 44 is mounted in the lower body 43 of the body 41 to have a predetermined space with an inner wall face of the lower body 43. The lower end of the tube bundle shroud 44 extends near the tube sheet 45.

Plural tube support plates 46 are arranged in the tube bundle shroud 44 on each position corresponding to a predetermined height, and they are supported by plural stay rods 47 extending upward from the tube sheet 45. A heat-transfer tube bundle 49 that has a reversed U-shape and includes plural heat-transfer tubes 48 is arranged in the tube bundle shroud 44. An end of each heat-transfer tube 48 is expanded and supported by the tube sheet 45, and a middle part thereof is supported by the plural tube support plates 46. In this case, the tube support plates 46 are formed with a large number of through-holes (not illustrated), and each heat-transfer tube 48 is supported as being inserted into each through-hole.

A channel head 50 is fixed to the lower end of the lower body 43. The channel head 50 is divided into an intake chamber 52 and an exhaust chamber 53 by a partition wall 51, and provided with an inlet nozzle 54 and an exit nozzle 55. One end of each heat-transfer tube 48 communicates with the intake chamber 52, while the other end communicates with the exhaust chamber 53. The cooling water pipe 14 is coupled to the inlet nozzle 54, while the cooling water pipe 15 is coupled to the exit nozzle 55.

The upper body 42 is provided with a steam-water separator 56 that separates feed water into steam and hot liquid, and a moisture separator 57 that removes moisture of the separated steam to bring the steam into almost a dry steam. A feed-water pipe 58 that feeds the secondary cooling water in the body 41 is inserted between the heat-transfer tube bundle 49 and the steam-water separator 56, and a steam outlet 59 is formed on a ceiling of the upper body 42. The body 41 is provided with a feed-water channel 41a in which the secondary cooling water fed into the body 41 from the feed-water pipe 58 flows down between the body 41 and the tube bundle shroud 44, is circulated upward by the tube sheet 45, and flows upward in the heat-transfer tube bundle 49, and during the circulation, the heat exchange is done between the secondary cooling water and the hot liquid (primary cooling water) flowing in each heat-transfer tube 48. The cooling water pipe 34 is coupled to the feed-water pipe 58, while the cooling water pipe 18 is coupled to the steam outlet 59.

The primary cooling water heated by the pressurized water reactor 12 is sent to the intake chamber 52 of the steam generator 13 via the cooling water pipe 14, circulates through a large number of heat-transfer tubes 48, and reaches the exhaust chamber 53. On the other hand, the secondary cooling water cooled by the steam condenser 26 is sent to the feed-water pipe 58 in the steam generator 13 via the cooling water pipe 34, passes through the feed-water channel 41a in the body 41, and executes the heat exchange with the hot liquid (primary cooling water) flowing through the heat-transfer tube 48. Specifically, the heat exchange is done between the high-pressure high-temperature primary cooling water and the secondary cooling water in the body 41, and the cooled primary cooling water is returned to the pressurized water reactor 12 from the exhaust chamber 53 via the cooling water pipe 15. On the other hand, the secondary cooling water heat-exchanged with the high-pressure high-temperature primary cooling water rises in the body 41, is separated into steam and hot liquid by the steam-water separator 56, and then, sent to the steam turbine 17 via the cooling water pipe 18, after the moisture in the steam is removed by the moisture separator 57.

The plural tube support plates 46 are provided with a predetermined space on the body 41 in the steam generator 13 thus configured, and the tube sheet 45 is provided on the lower end of the body 41. The plural heat-transfer tubes 48 forming the heat-transfer tube bundle 49 are fixed on their ends to a large number of mounting holes formed on the tube sheet 45, and the middle part of the plural heat-transfer tubes 48 is supported by a large number of through-holes formed on each of the tube support plates 46. The plural tube support plates 46 are supported by plural stay rods 47 extending upward from the tube sheet 45. As described above, the tube sheet 45 is formed with not only the mounting holes to which the heat-transfer tubes 48 are fixed, but also screw holes to which the stay rods 47 are screwed and tightened. The tube support plates 46 are formed with not only the through-holes through which the heat-transfer tubes 48 penetrate, but also support holes through which the stay rods 47 are inserted.

Since the tube sheet 45 is formed with a large number of mounting holes and screw holes, and the tube support plate 46 is formed with a large number of through-holes and support holes, an efficient hole drilling process is needed. The tube sheet 45 and the tube support plate 46 are formed with holes, each having a different shape. Therefore, the hole drilling process is executed considering this point.

A hole drilling device according to the present embodiment includes a processing head 61, plural (in the present embodiment, five) drilling tools 63 that are detachably mounted to the processing head 61 via a main shaft (or spindle) 62, a drive device 64 that can move the processing head 61 in a diameter direction of a mounting hole 60, which is formed on the tube sheet 45 serving as the member to be processed, and in the shaft direction, a control device 65 that drives the drive device 64, and a database 66 that stores processing data of the tube sheet 45, as illustrated in FIG. 1.

The drilling tools 63 are mounted to the processing head 61 along the direction of the arrangement of the mounting holes 60, and are provided with equal spacing of an integer multiple (more than twice) of a pitch of the mounting holes 60. The control device 65 drives the drive device 64 in such a manner that the processing head 61 moves in the arrangement direction of the drilling tools 63 for each pitch of the mounting holes 60 in order that the drilling tools 63 form holes.

The control device 65 drives the drive device 64. Accordingly, the processing head 61 moves on a group of one row including the mounting holes in the number obtained by multiplying an integer multiple of the pitch of the mounting holes 60 by the number of the drilling tools 63, and finishes the drilling process by the drilling tools 63, and then, the processing head 61 moves to the direction crossing the arrangement direction of the drilling tools 63 by the pitch of the mounting hole 60 so as to perform the drilling process to the adjacent group of one row by using the drilling tools 63.

The control device 65 drives the drive device 64 such that, when at least one of the plural drilling tools 63 reaches a position not requiring the drilling process, the drilling process by using all drilling tools 63 is not executed, and the processing head moves to the next drilled position.

When the member to be processed is the tube sheet 45 having a disk-like shape, the control device 65 drives the drive device 64 in such a manner that the processing head 61 moves along the outer periphery of the tube sheet 45 by using a group of one row of the mounting holes 60 in the diameter direction of the tube sheet 45 as a unit for performing the hole drilling by using the drilling tools 63. The control device 65 drives the drive device 64 in such a manner that, after the hole drilling using the predetermined number of drilling tools 63 is finished, the number of the drilling tools 63 is reduced.

Specifically, as illustrated in FIG. 8, the region of the tube sheet 45 where the mounting holes 60 are formed is divided into A, B, C, . . . . The control device 65 drives the drive device 64 such that the processing head 61 moves from the center of the region A to the right in the circumferential direction for performing the hole drilling by using the drilling tools 63, and then, moves to the left from the center along the circumferential direction for performing the hole drilling by using the drilling tools 63. Subsequently, the control device 65 drives the drive device 64 such that the processing head 61 moves from the center of the region B to the right in the circumferential direction for performing the hole drilling by using the drilling tools 63, and then, moves to the left from the center along the circumferential direction for performing the hole drilling by using the drilling tools 63. Then, the control device 65 drives the drive device 64 such that the processing head 61 moves from the center of the region C to the right in the circumferential direction for performing the hole drilling by using the drilling tools 63, and then, moves to the left from the center along the circumferential direction for performing the hole drilling by using the drilling tools 63.

In this case, the regions where the mounting holes 60 can be drilled by five drilling tools 63 of the processing head 61 are A, B, and C. After the hole drilling is finished for the regions A, B, and C, one of the drilling tools 63 is pulled out from the processing head 61, and then, the hole drilling is carried out for the region where the mounting holes 60 can be drilled by using four drilling tools 63. After the hole drilling by using four drilling tools 63 is finished, one of the drilling tools 63 is again pulled out from the processing head 61, and then, the hole drilling is carried out for the region where the mounting holes 60 can be drilled by using three drilling tools 63. Thus, the hole drilling is carried out by decreasing the number of the drilling tools 63 on the processing head 61.

The hole drilling process of the mounting hole 60 on the tube sheet 45 with the hole drilling device according to the present embodiment will be descried below with reference to FIGS. 9-1 to 12.

In the hole drilling process according to the present embodiment, the control device 65 reads design information of the tube sheet 45 from the database 66, and inputs the resultant in step S11, as illustrated in FIG. 12. The design information of the tube sheet 45 includes a number (total number of holes) of the mounting holes 60 to be formed on the tube sheet 45, a pitch Lh of all mounting holes 60, a number of columns formed by all mounting holes 60, the number of mounting holes 60 included in the columns, and a position (drilling-process unnecessary position) of the screw hole for the stay rod 47.

In step S12, the control device 65 sets the spindle-to-spindle pitch Ls. Specifically, the integral multiple is set as 5, considering the pitch Lh of the mounting hole 60, and the shape and size of the processing head 61 and the drilling tool 63. The spindle-to-spindle pitch Ls (5 Lh) can be calculated by multiplying the pitch Lh of the mounting hole 60 by 5, which is the integral multiple.

In step S13, the control device 65 calculates a hole-group range Lg. When the number of the drilling tools 63 mounted to the processing head 61 is supposed to be five, the hole-group range Lg can be calculated by multiplying the spindle-to-spindle pitch Ls by 5, which is the number of the drilling tools 63. When the spindle-to-spindle pitch Ls and the hole-group range Lg are set as described above, the mounting position of five drilling tools 63 on the processing head 61 is adjusted to set the space of five drilling tools 63 to the spindle-to-spindle pitch Ls in step S14. Thereafter, the processing head 61 moves with this state, and the drilling operation of the mounting hole 60 is started for the tube sheet 45.

Firstly, as illustrated in FIG. 8, the drilling process is executed to one vertical group located on the vertical center in the region A of the tube sheet 45. As illustrated in FIG. 9-1, the control device 65 firstly drives the drive device 64 so as to move the processing head 61 to a predetermined position on one vertical group Lg located on the vertical center in the region A of the tube sheet 45, whereby five mounting holes $60a$-11, $60a$-21, . . . $60a$-51 are drilled by five drilling tools 63. In this case, five mounting holes $60a$-11, $60a$-21, . . . $60a$-51 are located on a straight line, and the space between the mounting holes is equal to the spindle-to-spindle pitch Ls.

Then, as illustrated in FIG. 9-2, the control device 65 drives the drive device 64 so as to move the processing head 61 to a predetermined position, i.e., to an upward position by the pitch Lh of the mounting hole 60. Five mounting holes $60a$-12, $60a$-22, . . . $60a$-52 are drilled by five drilling tools 63. This process is repeated five times, whereby 25 continuous mounting holes $60a$-11, $60a$-12, . . . $60a$-15, $60a$-21, . . . $60a$-55 can be drilled on the straight line in the vertical direction with equal spacing of the pitch Lh as illustrated in FIG. 9-3.

After the drilling process of the mounting holes 60 is finished to the hole-group range Lg on one vertical column, the control device 65 drives the drive device 64 so as to move the processing head 61 to the right direction by the pitch Lh. The drilling process same as that described above is executed on this position. Specifically, as illustrated in FIG. 9-4, five mounting holes 60b-15, 60b-25, . . . 60b-55 on the right of five mounting holes 60a-15, 60a-25, . . . 60a-55 that have already been formed are drilled. The mounting holes 60 are drilled in the same manner as described above.

The tube sheet 45 has the drilling-process unnecessary position corresponding to the position of the screw hole of the stay rod 47. The case where the drilling-process unnecessary position is present during the drilling process of the mounting hole 60 will be described below. As illustrated in FIG. 10-1, a screw hole 47a of the stay rod 47 is set on the drilled position of the mounting hole 60a-24. The control device 65 drives the drive device 64 so as to move the processing head 61 to a predetermined position, whereby five mounting holes 60a-11, 60a-21, . . . 60a-51 are drilled by five drilling tools 63.

Then, as illustrated in FIG. 10-2, the control device 65 drives the drive device 64 so as to move the processing head 61 to a predetermined position, i.e., to an upward position by the pitch Lh of the mounting hole 60. Five mounting holes 60a-12, 60a-22, . . . 60a-52 are drilled by five drilling tools 63. After the mounting holes 60a-11, 60a-12, 60a-13, 60a-21, . . . 60a-53 are drilled by this process, the drive device 64 moves the processing head 61, whereby five drilling tools 63 move to the position of drilling five mounting holes 60a-14, 60a-24, . . . 60a-54. However, as illustrated in FIG. 10-3, the screw hole 47a for the stay rod 47 is set on the position of drilling the mounting hole 60a-24. Therefore, the processing head 61 moves to the next drilled position without drilling five mounting holes 60a-14, 60a-24, . . . 60a-54 by the drilling tools 63. Specifically, the processing head 61 moves to the position where five drilling tools 63 drill the mounting holes 60a-15, 60a-25, . . . 60a-55.

After the drilling process of the mounting holes 60 is finished to the hole-group range Lg on one vertical column, twenty mounting holes 60a-11, 60a-12, 60a-13, 60a-15, 60a-21, . . . 60a-55 except for four mounting holes 60a-24, 60a-34, 60a-44, and 60a-54 and the screw hole 47a (60a-24) are drilled. Thereafter, the control device 65 drives the drive device 64 so as to move the processing head 61 to the right direction by the pitch Lh. The drilling process same as that described above is executed on this position. Specifically, as illustrated in FIG. 10-4, five mounting holes 60b-15, 60b-25, . . . 60b-55 on the right of five mounting holes 60a-15, 60a-25, . . . 60a-55 that have already been formed are drilled. The mounting holes 60 are drilled in the same manner as described above.

Returning to the flowchart in FIG. 12, the control device 65 determines whether the hole drilling process is completed or not for all hole-group regions A to C in step S15. Specifically, the control device 65 performs the same process to the hole-group region B, after the hole drilling process to the hole-group region A is finished. After the hole drilling process to the hole-group region B is finished, the control device 65 executes the same process to the hole-group region C. After the hole drilling process to all hole-group regions A to C is finished, the hole drilling process to the regions A to C except for regions D to G is completed as illustrated in FIG. 11.

In step S16, it is determined whether the number of the drilling tools 63 mounted to the processing head 61 is the minimum or not. At the beginning, five drilling tools 63 are mounted to the processing head 61 for the drilling process. Therefore, in this case, the process proceeds to step S17 where one of the drilling tools 63 mounted to the processing head 61 is removed to reduce the number of the drilling tools.

In this case, one drilling tool 63 mounted on the end is removed. In step S18, the drilling process is executed with four drilling tools 63 being mounted to the processing head 61. In this case, the hole drilling process is carried out to the hole-group region D illustrated in FIG. 11. After the hole drilling process is finished to the hole-group region D, it is determined in step S19 whether the whole hole drilling process is finished or not. When it is not finished, the process returns to step S18. The hole drilling process in step S18 is almost the same as the process in step S14 described above.

Since the processes in steps S16 to S19 are repeated, all mounting holes 60 on the tube sheet 45 can be drilled, and in step S20, the whole hole drilling process can be completed. The hole drilling process is carried out for the hole-group region D by using the processing head 61 having mounted thereto four drilling tools 63, the hole drilling process is carried out for the hole-group region E by using the processing head 61 having mounted thereto three drilling tools 63, the hole drilling process is carried out for the hole-group region F by using the processing head 61 having mounted thereto two drilling tools 63, and the hole drilling process is carried out for the hole-group region G by using the processing head 61 having mounted thereto one drilling tool 63.

A BTA (Boring & Trepanning Association) processing device is applied to the hole drilling device according to the present embodiment. The hole drilling device (BTA processing device) has a main shaft 62 and a pressure head 67 mounted on the processing head 61 as illustrated in FIG. 2. The processing head 61 can move in the longitudinal direction (shaft direction, lateral direction in FIG. 2), and also can move in two directions (lateral direction, vertical direction) crossing (orthogonal to) the longitudinal direction, by the drive device 64 (see FIG. 1).

A boring bar (processing shaft) 68 is arranged to penetrate through the main shaft 62 and the pressure head 67, and can rotate by a motor (not illustrated) composing the main shaft 62. The drilling tool 63 can be mounted on the front end of the boring bar 68. FIG. 2 conceptually illustrates the BTA processing device. Actually, plural drilling tools 63 (five in the present embodiment) can be mounted. The pressure head 67 can externally feed cutting oil to the drilled position (mounting hole 60) on the tube sheet 45 by the drilling tool 63 via the drilling tool 63 and the peripheral portion of the boring bar 68, and can discharge the cutting oil and chips rearward via a discharge hole formed on the drilling tool 63 and in the boring bar 68. The pressure head 67 also includes an annular guide bush 69 that can support the drilling tool 63 on its front end.

A first drilling tool (hole drilling tool) 63a and a second drilling tool 63b can be exchanged and mounted to the BTA processing device according to the present embodiment. A temporary hole is drilled by using the first drilling tool 63a, and when the position of the temporary hole is not proper, the drilled position is corrected. When the position of the temporary hole becomes proper, a target hole is drilled by using the second drilling tool 63b.

When the mounting holes 60 are to be formed on the tube sheet 45, the tube sheet is divided into plural drilled regions A1, A2, B1, B2, C1, and C2 as illustrated in FIG. 8. The process is executed by moving the processing head 61 to the region A1, the region A2, the region B1, the region B2, the region C1, and the region C2 in this order. In this case, as illustrated by arrows, the processing head 61 moves upward on the drilled region A1 from the lower end in the vertical direction on the middle portion in the lateral direction of the tube sheet 45, and then, moves to the right along the circumferential direction, for drilling the holes by the drilling tools 63. Then, the processing head 61 moves upward on the drilled region A2, and then, moves to the left along the circumferential direction for forming the holes by the drilling tools 63. This process is executed for each of the drilled regions A1, A2, B1, B2, C1, and C2. The same applies to the drilled regions B1, B2, C1, and C2.

In this case, a large number of mounting holes 60 are formed on the tube sheet 45 one by one, so that the weight of a part of the tube sheet 45 reduces. Therefore, the weight balance is destroyed. Since the hole drilling process is continuously executed, the tube sheet 45 has high temperature, and thermally expands. Therefore, when the drilled region is shifted to the drilled regions A1, A2, B1, B2, C1, and C2, or when the mounting hole 60 that cannot be drilled is formed afterward, the drilled position on the tube sheet 45 set beforehand and the actual drilled position on the tube sheet 45 that has the destroyed balance or that thermally expands might be shifted from each other.

Accordingly, the hole drilling process according to the present embodiment is for drilling a hole on the tube sheet 45 by using the first drilling tool 63a that can drill a hole with a diameter smaller than that of a target hole (mounting hole 60), and the second drilling tool 63b that can drill a hole with a diameter equal to the diameter of the target hole, the process including: a temporary hole drilling step in which a temporary hole with a predetermined depth set beforehand is drilled by moving the first drilling tool 63a to a drilled position set beforehand; a hole measuring step in which a distance between an existing target hole (mounting hole 60) and the temporary hole; a drilled position correcting step in which the drilled position is corrected based upon the distance between the existing target hole and the temporary hole; and a target hole drilling step in which the target hole is drilled by moving the second drilling tool 63b to the corrected drilled position.

The hole drilling process according to the present embodiment also includes a position determining step in which whether the correction of the drilled position is needed or not is determined based upon the distance between the existing target hole and the temporary hole; and a second temporary hole drilling step in which, when the correction of the drilled position is determined to be needed, the first drilling tool 63a is moved to the corrected drilled position for drilling a temporary hole with a depth deeper than the depth in the previous temporary hole. When it is determined that the correction of the drilled position is not needed, the second drilling tool 63b is moved to the drilled position where the temporary hole is drilled, and the target hole is drilled in the target hole drilling step.

In this case, in the temporary hole drilling step, the first drilling tool 63a is mounted on the tip end of the boring bar 68 for drilling the temporary hole, and in the target hole drilling step, the second drilling tool 63b is mounted on the tip end of the boring bar 68 for drilling the target hole.

In the present embodiment, when the hole drilled position on the tube sheet 45 is different among the plural drilled regions A1, A2, B1, B2, C1, and C2, the hole drilling process is executed based upon the temporary hole drilling step, the hole measuring step, the drilled position correcting step, and the target hole drilling step described above. When a hole is drilled on a drilled position around which an existing target hole (mounting hole 60) is formed, the hole drilling process is carried out based upon the temporary hole drilling step, the hole measuring step, the drilled position correcting step, and the target hole drilling step described above.

The first drilling tool 63a and the second drilling tool 63b will be described. As illustrated in FIGS. 3 to 5, the first drilling tool 63a includes a cylindrical tool body 71. A male-screw portion 71a threaded to a female-screw portion 68a of the boring bar 68 is formed on the base end of the tool body 71, and a through-hole 71b communicating with a discharge hole 68b of the boring bar 68 is formed in the tool body 71. A first cutting blade 72 that can drill the temporary hole is fixed on the tip end of the tool body 71, and two first guide pads (guide member) 73 are fixed. The first cutting blade 72 is fixed on the tip end surface of the tool body 71 so as to tilt rearward (to the base end) from the center toward the outer periphery. On the other hand, the first guide pads 73 are fixed on the outer peripheral surface of the tip end of the tool body 71 on a position opposite to the first cutting blade 72, and on a rearward position from the first cutting blade 72 in the rotating direction, respectively.

The tool body 71 is provided with four second guide pads (guide member) 74 fixed on the tip end and on the outer periphery near the base end from the first cutting blade 72 and the first guide pads 73. The second guide pads 74 are fixed with equal spacing in the circumferential direction of the outer peripheral surface of the tool body 71. The number of the cutting blades 72 and the guide pads 73 and 74 is not limited to the number described in the present embodiment. The number may be one or more.

The first cutting blade 72 can drill the temporary hole with an inner diameter D1 by rotating the tool body 71. In this case, each first guide pad 73 can be in contact with the inner peripheral surface of the temporary hole with the inner diameter D1 for supporting the tool body 71. Each second guide pad 74 is in contact with the inner peripheral surface of the guide bush 69 (see FIG. 2) with the diameter equal to an inner diameter D2 of the target hole by rotating the tool body 71, thereby being capable of supporting the tool body 71. In this case, the inner diameter D1 of the temporary hole is slightly smaller than the inner diameter D2 of the mounting hole 60 that is the target hole. For example, when the inner diameter D2 of the mounting hole 60 serving as the target hole is supposed to be 19 mm, the inner diameter D1 of the temporary hole is set as 18, and the outer diameter D3 of the boring bar 68 is set as 18 mm that is slightly smaller than the inner diameter D1 of the temporary hole.

On the other hand, as illustrated in FIGS. 6 and 7, the second drilling tool 63b includes a cylindrical tool body 81. A male-screw portion 81a threaded to the female-screw portion 68a of the boring bar 68 is formed on the base end of the tool body 81, and a through-hole 81b communicating with the discharge hole 68b of the boring bar 68 is formed in the tool body 81. Three second cutting blades 82 that can drill the target hole are fixed on the tip end of the tool body 81, and three third guide pads (guide member) 83 are fixed. The second cutting blade 82 is fixed on the tip end surface of the tool body 81 so as to tilt rearward (to the base end) from the center toward the outer periphery. On the other hand, each third guide pad 83 is fixed on the outer peripheral surface of the tip end of the tool body 81 on the position opposite to the diameter direction of one second cutting blade 82, and on positions shifted by about 90 degrees from the second cutting blade 82 in the circumferential direction. In this case, each third guide pad 83 is fixed as being shifted in the axial direction of the tool body 81. The number of the cutting blades 82 and the guide pads 83 is not limited to the number described in the present embodiment. The number may be one or more.

The second cutting blade 82 can drill the target hole (mounting hole 60) with the inner diameter D2 by rotating the tool body 81. In this case, each third guide pad 83 can be in contact with the inner peripheral surface of the target hole with the inner diameter D2 for supporting the tool body 81.

The hole drilling process of the mounting hole 60 on the tube sheet 45 by using two drilling tools 63a and 63b will be descried below with reference to FIGS. 13-1 to 14.

In the hole drilling process according to the present embodiment, the first drilling tool 63a is moved to the drilled position set beforehand so as to drill the temporary hole with the predetermined depth set beforehand in step S31 in FIG. 14. In this case, the drilled position set beforehand means the drilled positions for plural mounting holes 60 set according to the shape and size of the tube sheet 45, and the drilled positions are stored in the control device 65. The predetermined depth of the temporary hole set beforehand is the depth smaller than a half of the depth of the temporary hole that can be drilled by the first drilling tool 63a.

Specifically, as illustrated in FIG. 13-1, the first drilling tool 63a is mounted on the tip end of the boring bar 68, and this boring bar 68 advances, while rotating. The first drilling tool 63a mounted on the tip end of the boring bar 68 passes through the guide bush 69, and forms a temporary hole 60A on the predetermined drilled position on the tube sheet 45 as illustrated in FIG. 13-2. In this case, the first drilling tool 63a passes in such a manner that the first guide pad 73 is not brought into contact with the guide bush 69, but the second guide pad 74 is brought into contact with the inner peripheral surface of the guide bush 69, whereby vibration of the first drilling tool 63a is prevented. Since the boring bar 68 advances, the temporary hole 60A with the predetermined depth is formed on the tube sheet 45 by the first drilling tool 63a.

Returning to FIG. 14, the distance S between the neighboring existing hole (mounting hole 60) and the temporary hole 60A that is formed by this process is measured in step S32. Specifically, after the temporary hole 60A with the predetermined depth is formed on the predetermined position of the tube sheet 45 by the first drilling tool 63a, the boring bar 68 retreats, and then, the first drilling tool 63a is pulled out from the temporary hole 60A. As illustrated in FIG. 13-3, the distance S between the target hole (mounting hole 60) that has already been formed and the temporary hole 60A formed by this process is measured by a tool not illustrated.

Returning to FIG. 14, it is determined in step S33 whether or not the measured distance S between the target hole (mounting hole 60) and the temporary hole 60A falls within a reference range set beforehand, i.e., whether the correction of the drilled position is needed or not. When it is supposed that the inner diameter D2 of the mounting hole 60 that is to become the target hole is 19 mm, the inner diameter D1 of the temporary hole is set as 18, and the space to the adjacent mounting hole 60 is set as L, the reference distance is L+0.5 mm. The reference range is determined by adding a design tolerance to this reference distance. When it is determined that the measured distance S between the target hole (mounting hole 60) and the temporary hole 60A does not fall within the reference range, i.e., it is determined that the correction of the drilled position is needed, the corrected drilled position is calculated in order that the measured distance S between the target hole (mounting hole 60) and the temporary hole 60A falls within the reference range, and if possible, in order that the distance S becomes equal to the reference distance S, in step S34.

The boring bar 68 is moved in the vertical direction and in the lateral direction in step S35 to adjust its position, and the drilled position by the first drilling tool 63a is set as the corrected drilled position. A temporary hole 60B with the predetermined depth is formed on the tube sheet 45 by the first drilling tool 63a by rotating and advancing the boring bar 68 in the same manner as described above. In this case, the temporary hole 60B with the depth deeper than the depth of the previously-formed temporary hole 60A is formed as illustrated in FIG. 13-3. Returning to FIG. 14, it is determined in step S36 whether or not the measured distance S between the target hole (mounting hole 60) and the temporary hole 60B falls within the reference range set beforehand as described above. When it is determined that the measured distance S between the target hole (mounting hole 60) and the temporary hole 60B does not fall within the reference range, the process returns to step S34 to repeat the above-mentioned operation.

On the other hand, when it is determined in step S36 that the measured distance S between the target hole (mounting hole 60) and the temporary hole 60B falls within the reference range set beforehand, the second drilling tool 63b is moved to drill the target hole on the corrected drilled position in step S37. Specifically, as illustrated in FIG. 13-4, the first drilling tool 63a is removed from the tip end of the boring bar 68, and the second drilling tool 63b is mounted instead. This boring bar 68 advances while rotating. The second drilling tool 63b mounted on the tip end of the boring bar 68 passes through the guide bush 69, and forms the mounting hole 60 serving as the target hole on the predetermined drilled position on the tube sheet 45 as illustrated in FIG. 13-5. In this case, the third guide pad 83 of the second drilling tool 63b is in contact with the inner peripheral surface of the guide bush 69, whereby the vibration of the second drilling tool 63b can be prevented. Since the boring bar 68 advances, the mounting hole 60 is formed on the tube sheet 45 by the second drilling tool 63b as illustrated in FIG. 13-6.

When it is determined in step S33 that the measured distance S between the target hole (mounting hole 60) and the temporary hole 60A falls within the reference range, i.e., it is determined that the correction of the drilled position is not needed, the target hole is drilled by moving the second drilling tool 63b on the drilled position where the temporary hole A is drilled in step S38.

In the present embodiment, when the hole drilled position on the tube sheet 45 is changed to the drilled region B1 from the drilled region A2 as illustrated in FIG. 15, for example, the temporary hole 60A is formed by the first drilling tool 63a, and after the drilled position of the temporary hole 60A is confirmed, the mounting hole 60 serving as the target hole is formed by using the second drilling tool 63b, as described above. In this case, the distance S between the existing mounting hole 60 and the temporary hole 60A is measured between the drilled region B1 and the drilled region A1 adjacent to the drilled region B1 for determining whether the correction of the drilled position is needed or not.

In this case, only the drilled position in the vertical direction of the tube sheet 45 is corrected. Therefore, after plural mounting holes 60 are formed on the drilled region B1, the distance S between the existing mounting hole 60 and the temporary hole 60A is again measured between the drilled region B1 and the drilled region A1 for determining whether the correction of the drilled position is needed or not. The distance S between the existing mounting hole 60 and the temporary hole 60A is measured only in the drilled region B1 for determining whether the correction of the drilled position is needed or not. Before the mounting hole 60 is drilled on the drilled region A1, the mounting holes 60 are drilled only on one vertical column in the drilled region A2. When the drilling process of the mounting hole 60 in the drilled region A2 is carried out after the drilling process of the mounting hole 60 is finished in the drilled region A1, the distance S between the existing mounting hole 60 and the temporary hole 60A in the drilled region A2 is measured for determining whether the correction of the drilled position is needed or not.

When the mounting hole 60 cannot be drilled on only one position because of some reason as illustrated in FIG. 16, distances S1, S2, S3, and S4 between the temporary hole 60A and each of the neighboring mounting holes 60 are measured for determining whether the correction of the drilled position is needed or not. When there are plural distances S1, S2, S3, and S4 because the number of the tools 63*a* and 69*b* that are simultaneously used is more than one, the correction amount of the drilled position may be calculated by using an average of these distances.

As described above, the hole drilling process according to the present embodiment uses the first drilling tool 63*a* that can drill a hole having a diameter smaller than a diameter of a target hole, which is to become the mounting hole 60, on the supported tube sheet 45, and the second drilling tool 63*b* that can drill a hole having a diameter equal to the diameter of the target hole, the process including a temporary hole drilling step in which a temporary hole with a predetermined depth set beforehand is drilled by moving the first drilling tool 63*a* to a drilled position set beforehand; a hole measuring step in which the distance S between the existing mounting hole 60 and the temporary hole 60A; a drilled position correcting step in which the drilled position is corrected based upon the distance S between the existing mounting hole 60 and the temporary hole 60A; and a target hole drilling step in which the target hole is drilled by moving the second drilling tool 63*b* to the corrected drilled position.

Therefore, the temporary hole 60A is drilled on the drilled position set beforehand, the distance S between the existing mounting hole 60 and the temporary hole 60A is measured, the drilled position is corrected based upon the measured distance S, and the target hole is drilled on the corrected drilled position. Accordingly, even if the weight balance of the tube sheet 45 is destroyed, or the tube sheet 45 thermally expands, the drilled position is corrected according to the destroyed balance or the thermal expansion. Consequently, a high precise hole drilling process can be realized with a simple technique.

The hole drilling process according to the present embodiment also includes a position determining step in which it is determined whether the correction of the drilled position is needed or not based upon the distance S between the existing mounting hole 60 and the temporary hole 60A; and a second temporary hole drilling step in which, when it is determined that the correction of the drilled position is needed, the first drilling tool 63*a* moves to the corrected drilled position so as to form a temporary hole having a depth deeper than that of the previously-formed temporary hole. When it is determined that the correction of the drilled position is needed based upon the distance S between the mounting hole 60 and the temporary hole 60A, the first drilling tool 63*a* is moved to the corrected drilled position so as to form a temporary hole having a depth deeper than that of the previously-formed temporary hole. Therefore, whether the correction of the drilled position is needed or not can repeatedly be determined based upon the distance S between the mounting hole 60 and the temporary hole 60A, whereby the precision of drilling the target hole can be enhanced.

In the hole drilling process according to the present embodiment, when it is determined that the correction of the drilled position is unnecessary, the second drilling tool 63*b* is moved to the position where the temporary hole 60A is drilled in the previous process to form the target hole in the target hole drilling step. Accordingly, when it is determined that the correction of the drilled position is unnecessary, the target hole is drilled on the same position by using the second drilling tool 63*b*. Therefore, the precision of drilling the target hole can be enhanced.

In the hole drilling process according to the present embodiment, the first drilling tool 63*a* or the second drilling tool 63*b* can be mounted on the tip end of the boring bar 68 that is rotatable, and that can move in the axial direction and in two directions crossing the axial direction, wherein the first drilling tool 63*a* is mounted on the tip end of the boring bar 68 in the temporary hole drilling step, and the second drilling tool 63*b* is mounted on the tip end of the boring bar 68 in the target hole drilling step. Therefore, the first drilling tool 63*a* and the second drilling tool 63*b* can be exchanged, so that the temporary hole and the target hole can easily be drilled. Accordingly, the precision of drilling the target hole can be enhanced with a simple operation.

In the hole drilling process according to the present embodiment, the hole drilled region of the tube sheet 45 is divided into plural regions A1, A2, B1, B2, C1, and C2, and when the drilled regions A1, A2, B1, B2, C1, and C2 are changed, the hole drilling process is carried out based upon the temporary hole drilling step, the hole measuring step, the drilled position correcting step, and the target hole drilling step. When the drilled regions A1, A2, B1, B2, C1, and C2 are changed, whether the correction of the drilled position is needed or not is determined based upon the measured distance S between the existing mounting hole 60 and the temporary hole 60A, whereby the precision of drilling the target hole can be enhanced.

In the hole drilling process according to the present embodiment, when the hole drilling process is executed on the drilled position around which the existing mounting hole 60 is formed, the hole drilling process is carried out based upon the temporary hole drilling step, the hole measuring step, the drilled position correcting step, and the target hole drilling step. When the hole drilling process is carried out on the drilled position around which the mounting holes 60 are formed, whether the correction of the drilled position is needed or not based upon the measured distance S between the existing target hole and the temporary hole, whereby the precision of drilling the target hole can be enhanced.

The drilling tool according to the present embodiment is used in the hole drilling process to the supported tube sheet 45 in which a temporary hole with a diameter smaller than a diameter of a target hole is drilled, and the target hole is drilled to the temporary hole after the measurement and the determination of the drilled position of the temporary hole, the drilling tool being the first drilling tool 63*a* for drilling the temporary hole, and including the cylindrical tool body 71, the cutting blade 72 provided on the tip end of the tool body 71 so as to be capable of drilling the temporary hole, and the second guide pad 74 that is provided on the tip end of the tool body 71 closer to the base end than to the cutting blade 72, and that has an outer diameter equal to the inner diameter of the target hole.

When the temporary hole is drilled by moving forward the first drilling tool 63*a*, the cutting blade 72 of the tool body 71 drills the temporary hole on the tube sheet 45, and the second guide pad 74 guides the tool body 71. Therefore, the vibration of the tool body 71 can be prevented, whereby the precision of drilling the temporary hole and the target hole can be enhanced.

In the embodiment described above, the structure of each component (cutting blades 72 and 82, the guide pads 73, 74, and 83) on each of the drilling tools 63*a* and 63*b* is not limited to those described in the embodiments. The structure of each component may be changed according to the member to be processed. In the present embodiment, the hole drilling device is described as the BTA device. However, the hole drilling device may be a drilling device (gun drill).

In the embodiment described above, the number of the drilling tools 63 mounted to the processing head 61 is five. However, the number is not limited to five. The drilling tools 63 mounted to the processing head 61 are arranged in one row. However, the drilling tools 63 may be arranged on two or more rows. The space between the drilling tools 63 is five times the pitch of the mounting hole 60. However, the space is not limited thereto, and it may be set, according to need, considering the shape and size of the processing head 61 and the drilling tool 63.

In the embodiment described above, the member to be processed is the tube sheet 45, and the drilled hole is the mounting hole 60. However, the member to be processed may be the tube support plate 46, and the drilled hole may be the through-hole supporting the heat-transfer tube 48. The member to be processed is the tube support plate 46 or the tube sheet 45 in the steam generator 13. However, the member to be processed may be a plate material with a predetermined thickness formed with a large number of holes, and the present invention can be applied to any field.

REFERENCE SIGNS LIST

11 CONTAINMENT
12 PRESSURIZED WATER REACTOR
13 STEAM GENERATOR
17 STEAM TURBINE
19 HIGH-PRESSURE TURBINE
20 LOW-PRESSURE TURBINE
21 GENERATOR
41 BODY
45 TUBE SHEET (MEMBER TO BE PROCESSED)
46 TUBE SUPPORT PLATE
44 TUBE BUNDLE SHROUD
48 HEAT-TRANSFER TUBE
49 HEAT-TRANSFER TUBE BUNDLE
60 MOUNTING HOLE
61 PROCESSING HEAD
63 DRILLING TOOL
63a FIRST DRILLING TOOL
63b SECOND DRILLING TOOL (HOLE DRILLING TOOL)
64 DRIVE DEVICE
65 CONTROL DEVICE
67 PRESSURE HEAD
68 BORING BAR (PROCESSING SHAFT)
71 TOOL BODY
72 FIRST CUTTING BLADE
73 FIRST GUIDE PAD (GUIDE MEMBER)
74 SECOND GUIDE PAD (GUIDE MEMBER)
81 TOOL BODY
82 SECOND CUTTING BLADE
83 THIRD GUIDE PAD (GUIDE MEMBER)

The invention claimed is:

1. A hole drilling process for drilling a hole on a supported member to be processed by using a first drilling tool that can drill a hole with a diameter smaller than that of a target hole, and a second drilling tool that can drill a hole with a diameter equal to the diameter of the target hole, the process comprising:
   a temporary hole drilling step in which a temporary hole with a predetermined depth set beforehand is drilled by moving the first drilling tool to a drilled position set beforehand;
   a hole measuring step in which a distance between an existing target hole and the temporary hole;
   a drilled position correcting step in which the drilled position is corrected based upon the distance between the existing target hole and the temporary hole; and
   a target hole drilling step in which the target hole is drilled by moving the second drilling tool to the corrected drilled position.

2. The hole drilling process according to claim 1, further comprising: a position determining step in which whether the correction of the drilled position is needed or not is determined based upon the distance between the existing target hole and the temporary hole; and a second temporary hole drilling step in which, when the correction of the drilled position is determined to be needed, the first drilling tool is moved to the corrected drilled position for drilling a temporary hole with a depth deeper than the depth of the previously-formed temporary hole.

3. The hole drilling process according to claim 2, wherein the second drilling tool is moved to the drilled position where the temporary hole is drilled in the previous process for drilling the target hole in the target hole drilling step, when it is determined that the correction of the drilled position is not needed.

4. The hole drilling process according to claim 1, wherein the first drilling tool or the second drilling tool can be mounted on a tip end of a processing shaft that is rotatable and that can move in the shaft direction and in two directions crossing the shaft direction, the first drilling tool is mounted on the tip end of the processing shaft in the temporary hole drilling step, and the second drilling tool is mounted on the tip end of the processing shaft in the target hole drilling step.

5. The hole drilling process according to claim 1, wherein the member to be processed includes a hole drilled region that is divided into plural regions, and the hole drilling process is carried out based upon the temporary hole drilling step, the hole measuring step, the drilled position correcting step, and the target hole drilling step, when the drilled region is changed.

6. The hole drilling process according to claim 1, wherein the hole drilling process is carried out based upon the temporary hole drilling step, the hole measuring step, the drilled position correcting step, and the target hole drilling step, when a hole is drilled on a drilled position around which an existing target hole is formed.

* * * * *